(12) United States Patent
Cornell et al.

(10) Patent No.: US 11,957,524 B2
(45) Date of Patent: Apr. 16, 2024

(54) ASSEMBLY FOR LOCATING AND VERIFYING THE ANATOMIC POSITION OF A FULL-ARCH DENTAL PROSTHETICS

(71) Applicant: Jensen Industries Inc., North Haven, CT (US)

(72) Inventors: Donald F. Cornell, Madison, CT (US); William F. Gross, North Haven, CT (US)

(73) Assignee: JENSEN INDUSTRIES INC., North Haven, CT (US)

( * ) Notice: Subject to any disclaimer, the term of this patent is extended or adjusted under 35 U.S.C. 154(b) by 285 days.

(21) Appl. No.: 17/092,493

(22) Filed: Nov. 9, 2020

(65) Prior Publication Data

US 2021/0137656 A1     May 13, 2021

Related U.S. Application Data

(60) Provisional application No. 62/931,999, filed on Nov. 7, 2019.

(51) Int. Cl.
*A61C 13/10*    (2006.01)
*A61C 9/00*     (2006.01)
(Continued)

(52) U.S. Cl.
CPC ............ *A61C 13/102* (2013.01); *A61C 9/004* (2013.01); *A61C 13/01* (2013.01); *A61C 13/34* (2013.01)

(58) Field of Classification Search
CPC ....... A61C 13/102; A61C 9/004; A61C 13/01; A61C 13/0001; A61C 19/05; A61C 13/10; A61C 8/0081; A61C 9/0046; A61C 13/0003; A61C 13/0004; G06T 17/00; G06T 19/20; G16H 30/00; G16H 50/50
See application file for complete search history.

(56) References Cited

U.S. PATENT DOCUMENTS 3,798,770 A * 3/1974 Mitchell .............. A61C 13/235
                                                      433/189
4,693,686 A    9/1987 Sendax
(Continued)

OTHER PUBLICATIONS

International Search Report dated Mar. 11, 2021 in corresponding International Patent Application Serial No. PCT/US2020/059617.
(Continued)

*Primary Examiner* — Rick K Chang
(74) *Attorney, Agent, or Firm* — Troutman Pepper Hamilton Sanders LLP

(57) ABSTRACT

A dental prosthetic positioning assembly comprises an occlusal assembly and a maxillary arch subassembly. The occlusal assembly includes a maxillary tray configured to be formed in a patient's maxillary alveolar ridge, wherein the maxillary tray comprises a occlusal rim component. The occlusal assembly further includes a carriage frame component composed of biocompatible magnetic metal material anchored to the maxillary tray. The maxillary arch subassembly comprises a plurality of prosthetic maxillary teeth components magnetically anchored to the occlusal rim component. The carriage frame component is moveable with respect to the maxillary tray. The prosthetic maxillary teeth components are individually moveable with respect to each other to achieve a desired dental positioning.

18 Claims, 35 Drawing Sheets

(51) Int. Cl.
*A61C 13/01* (2006.01)
*A61C 13/34* (2006.01)

(56) References Cited

U.S. PATENT DOCUMENTS

| | | |
|---|---|---|
| 5,049,075 A | 9/1991 | Barrut |
| 11,173,016 B2 | 11/2021 | Watson |
| 2012/0077141 A1 | 3/2012 | Massad |
| 2012/0171642 A1 | 7/2012 | Mehl |
| 2013/0158958 A1 | 6/2013 | Methot |
| 2014/0356806 A1 | 12/2014 | Liebman |
| 2017/0112600 A1 | 4/2017 | Fisker |
| 2017/0258560 A1 | 9/2017 | Llop |
| 2017/0312061 A1 | 11/2017 | Slavicek |
| 2019/0201172 A1 | 7/2019 | Balshi et al. |

OTHER PUBLICATIONS

Invitation to Pay Additional Fees dated Dec. 23, 2020 in corresponding International Patent Application Serial No. PCT/US2020/059617.

Partial Supplementary European Search Report dated Oct. 6, 2023 in related European Patent Application No. 20886012.2.

\* cited by examiner

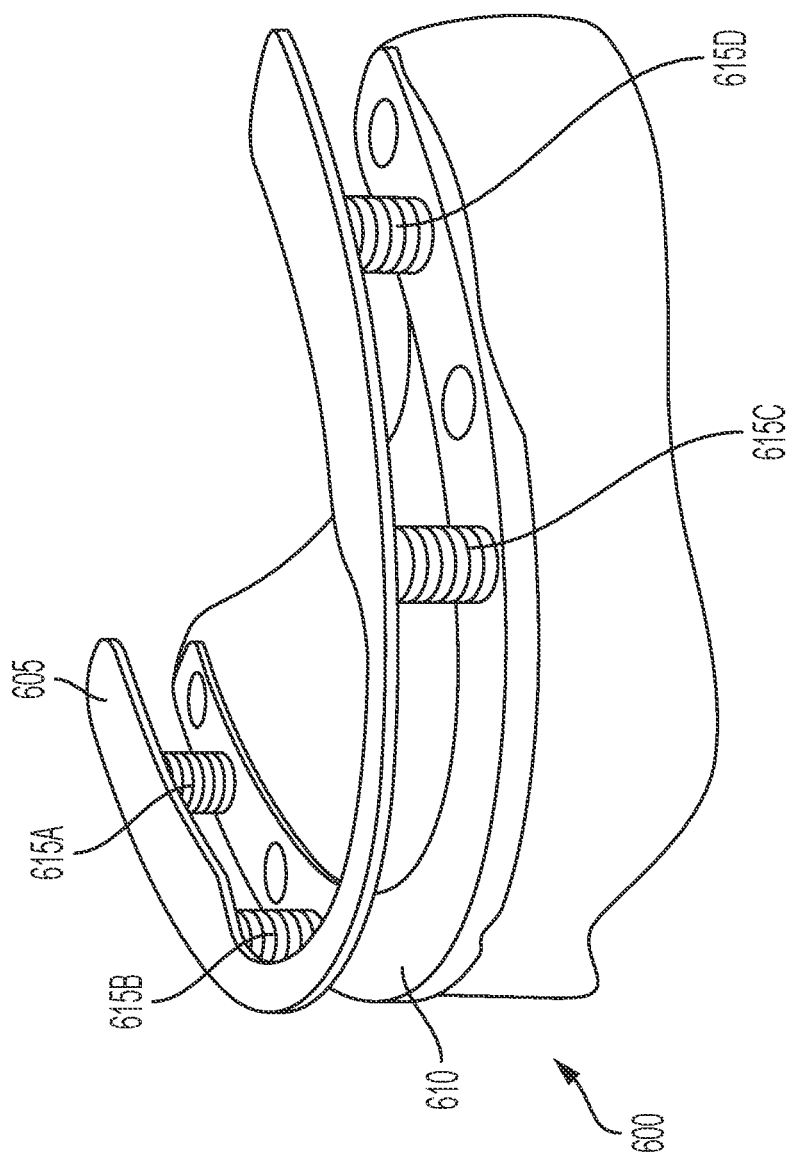

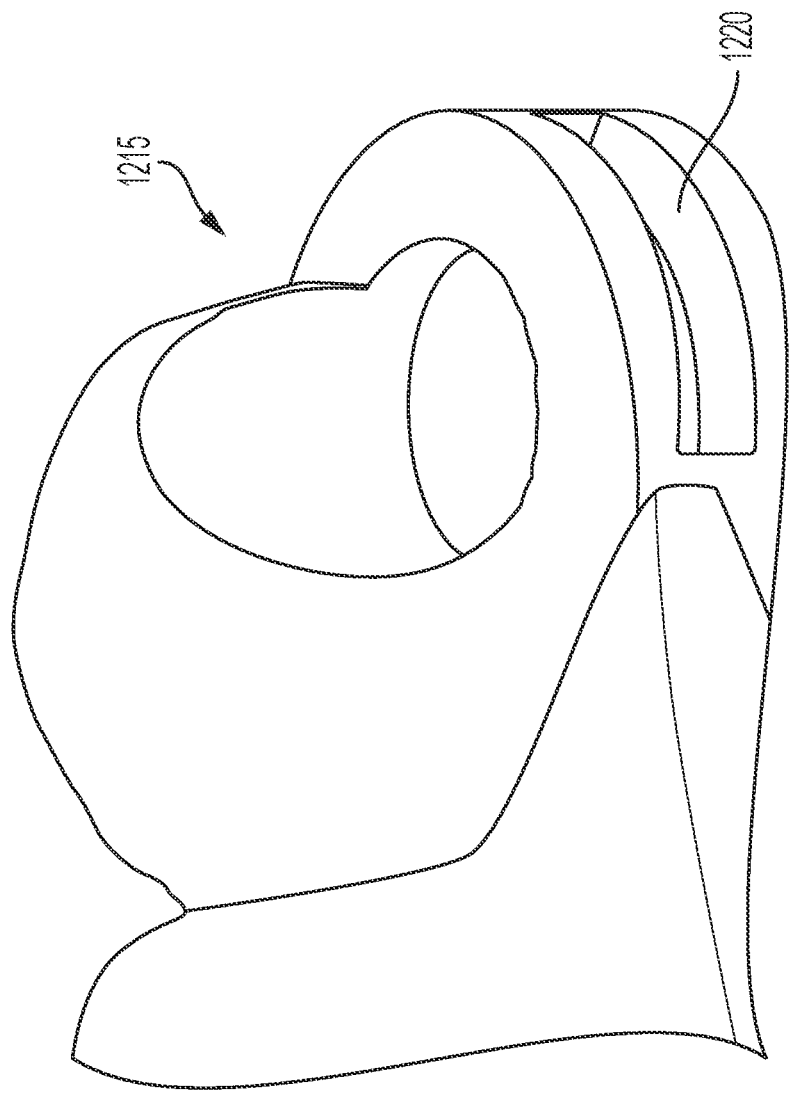

ASSEMBLY FOR LOCATING AND VERIFYING THE ANATOMIC POSITION OF A FULL-ARCH DENTAL PROSTHETICS

CROSS REFERENCE TO RELATED APPLICATIONS

This application claims the benefit of priority of U.S. Provisional Patent Application Ser. No. 62/931,999, filed on Nov. 7, 2019, the entire contents of which are hereby incorporated herein.

TECHNICAL FIELD

The present disclosure relates generally to locating and verifying the anatomic position of a full-arch dental prosthetic. The technique described herein may be used, for example, in designing and fitting implant or tissue supported dentures for a patient.

BACKGROUND

The restoration of a full edentulous patient is a time consuming and involved process where a dentist provides a patient-specific setup template to a dental laboratory technician to design dentures which will meet the functional and aesthetic requirements of the patient, including speech phonetics. The traditional setup template (referred to as a "wax rim," "occlusal rim," or "bite block") is a block of wax that is adjusted and marked to capture the patient-specific prosthetic design considerations for the dentures. The information that a setup template captures is critically important to design a tooth replacement prosthetic that restores proper function of the masticatory system, speech, and smile aesthetics. The three dimensional information required to restore an edentulous patient includes the occlusal plane; midline; incisal edge position; buccal corridor; vertical dimension; lip support and lip dynamics (high and low smile lines); and the canine position (the "3D Parameters"). The traditional wax rim however, can only provide a subset of the 3D Parameters. It does not capture the occlusal plane, buccal corridor, and sometimes the vertical dimension. It is also unable to assist in the assessment of function and speech phonetics.

In the conventional method of designing the customized dentures, a dentist places pre-made denture teeth one-by-one into the wax rim by hand. As each tooth is placed, the dentist checks how the upper teeth fit into the 3D Parameters described above, and adjusts them accordingly. This is a highly skilled and time consuming process. Once all the denture teeth are placed in wax and the design is finished, the "wax-up" is shipped to a dental laboratory for the positioning of the posterior teeth and the processing of a wax trial denture. The wax trial denture is then returned to the dentist. Then the dentist will place the wax-up into the mouth of the patient and verify the 3D Parameters are satisfactory.

If adjustments are needed in the wax-up, the dentist either makes the desired changes chairside or documents the changes with a combination of photos, videos, and written descriptions. The wax up is then shipped back to the dental technician along with the requested changes. The technician adjusts the wax up then ships the modified wax up back to the dentist to evaluate the changes with the patient. This process repeats until the wax up is acceptable to both the dentist and the patient, and may take numerous sessions to perfect.

SUMMARY

Embodiments of the present invention address and overcome one or more of the above shortcomings and drawbacks by providing methods, systems, and apparatuses related to locating and verifying the anatomic position of all the individual teeth within a full-arch dental prosthetic.

According to some embodiments, a dental prosthetic positioning assembly comprises an occlusal assembly and a maxillary arch subassembly. The occlusal assembly includes a maxillary tray configured to be formed in a patient's maxillary alveolar ridge, wherein the maxillary tray comprises a occlusal rim component. The occlusal assembly further includes a carriage frame component composed of biocompatible magnetic metal material anchored to the maxillary tray. The maxillary arch subassembly comprises a plurality of prosthetic maxillary teeth components magnetically anchored to the occlusal rim component. The carriage frame component is moveable with respect to the maxillary tray. The prosthetic maxillary teeth components are individually moveable with respect to each other to achieve a desired dental positioning.

According to another aspect of the present invention, in some embodiments, a method for creating a dental prosthetic includes assembling a maxillary arch subassembly and occlusal assembly in a patient's mouth. The maxillary arch subassembly and the occlusal assembly each comprise a plurality of moveable components. The method further includes adjusting one or more of the patient's midline, incisal edge position, lip support, and buccal corridor by repositioning one or more the moveable components. The final position of the maxillary arch subassembly and the occlusal assembly are secured into a dental prosthetic positioning assembly template for manufacturing the dental prosthetic.

According to another aspect of the present invention, in some embodiments, a method for producing a denture based on a template includes receiving, by a computer assisted design (CAD) system, one or more digital meshes depicting a dental prosthetic positioning assembly template comprising a plurality of template maxillary arch teeth. A library of tooth and arch anatomy corresponding to the maxillary arch teeth are identified in the dental prosthetic positioning assembly template. The library of tooth and arch anatomy comprises a plurality of library tooth models. A plurality of maxillary arch teeth from the library of tooth and arch anatomy are aligned (automatically or manually) with the plurality of template maxillary arch teeth. A plurality of mandibular arch teeth from the library of tooth and arch anatomy are automatically positioned based on pre-determined occlusion parameters applied to the plurality of maxillary arch teeth. A gingival anatomy are automatically positioned based on positioning of the plurality of maxillary arch teeth and the plurality of mandibular arch teeth. A digital model of the denture is generated based on the plurality of maxillary arch teeth, the plurality of mandibular arch teeth, and the gingival anatomy.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawing.

For the purpose of illustrating the invention, there is shown in the drawing embodiments that are presently preferred, it being understood, however, that the invention is not limited to the specific instrumentalities disclosed. Included in the drawing are the following Figures:

FIGS. 6A and 6B illustrate how spacers can be used to adjust the distance between the carriage frame and custom maxillary tray, wherein spacers are either magnets or retained magnetically;

FIGS. 12A-12D illustrate the process of connecting the mandibular anterior component to the maxillary anterior component by use of spacers;

DETAILED DESCRIPTION

The following disclosure describes the present invention according to several embodiments directed at methods, systems, and apparatuses related to locating and verifying the anatomic position of a full-arch dental prosthetic using a prosthetic positioning assembly. The prosthetic positioning assembly aids clinicians in locating and verifying the 3D Parameters, function and phonetics. As described in further detail below, the prosthetic positioning assembly may be provided to clinicians as a collection of standardized parts that are intended to be used by a clinician as a template to locate and verify the anatomic position for a full-arch dental prosthetic. This collection is referred to herein as the "Unity Kit." To cover the breadth of anatomical mouth sizes and shapes, the kit may be divided into multiple template choices. For example, in some embodiments, 3 arch sizes and 5 tooth forms are provided. The combination of these arch sizes and tooth forms, along with the dynamic positioning apparatus described below, enable a clinician to create a template for the final prosthetic in a wide variety of patients.

Creation of a full arch prosthetic with the Unity System occurs in a series of discrete steps. First, the clinician uses the Unity kit templates (as described above) chairside to find the correct 3D position for the prosthetic as well as arch form and tooth shape. The 3D position of the unity kit template in the mouth after all 3D parameters have been verified represents a "patient-specific" template which is unique to that patient (referred to as "customized template", "template", or "wax-up"). In this context, "chairside" means within the clinician's office while the patient is being examined by the clinician. Next, the customized Unity Template is digitized with an optical scanner and used as a template to design the prosthetic using dental Computer-Aided Design ("CAD") software. All analog tooth forms and sizes in the arch are represented in a digital anatomy library located in the CAD, to rapidly design a prosthetic device. This design can be used to achieve several different prosthetic devices including a provisional soft tissue supported denture, an implant supported provisional denture, a surgical guide for implant placement, or alternatively, a definitive restoration.

Figure 1A:
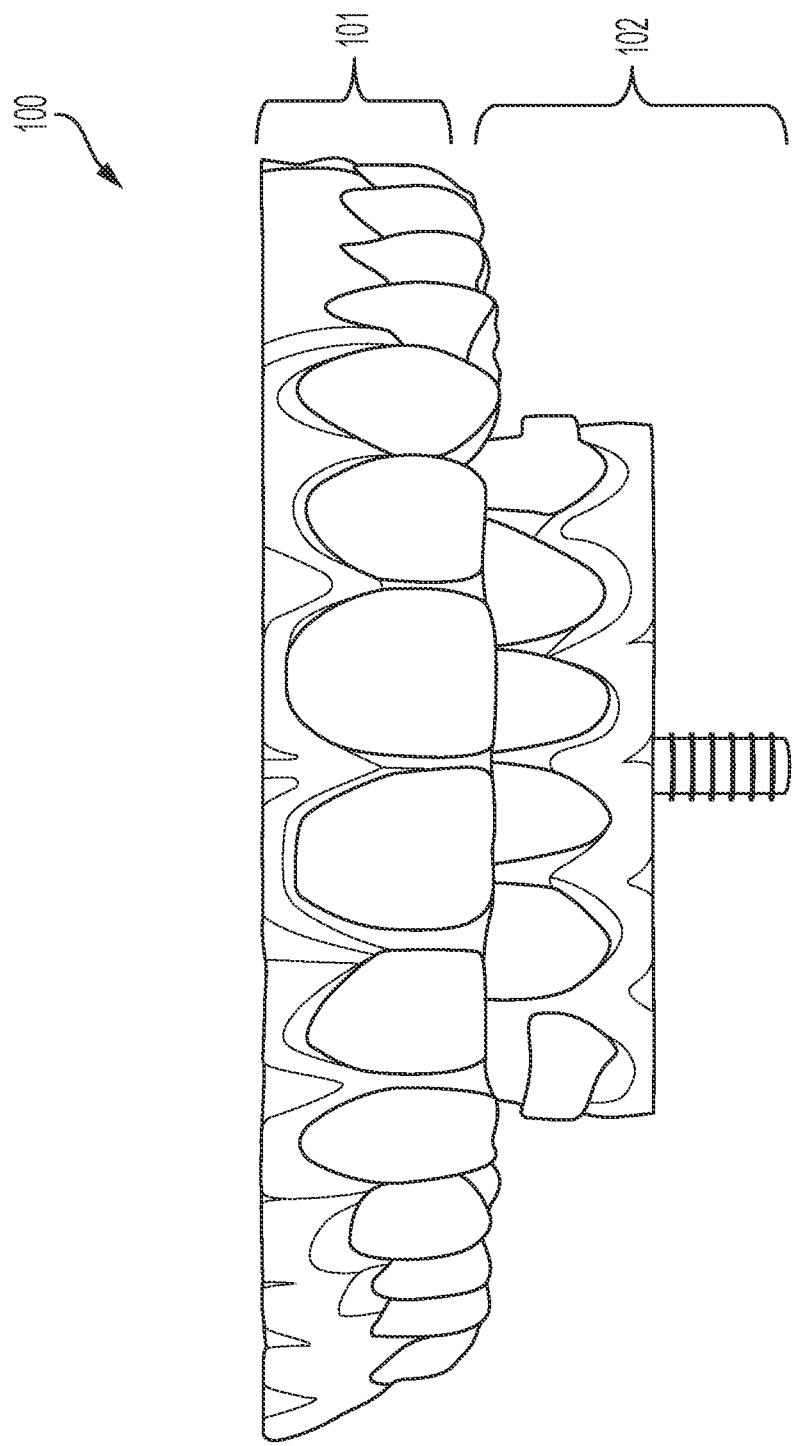
FIG. 1A provides a facial view of a prosthetic positioning assembly in a square tooth form.
Figure 1B:
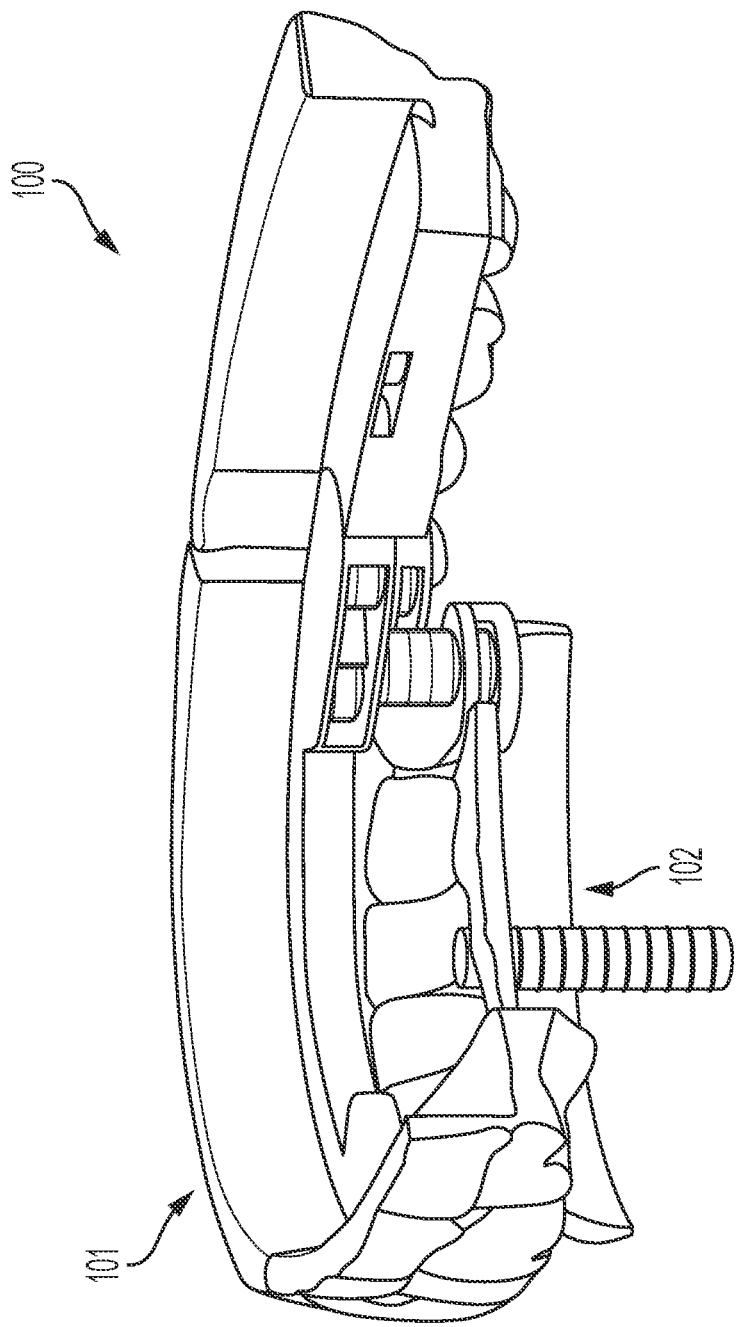
FIG. 1B shows a lingual view of the prosthetic positioning assembly shown in FIG. 1A.

FIG. 1A provides a facial view of the Prosthetic Positioning Assembly 100 in square tooth form. As described in further detail below, various tooth forms may be used as desired to match the patient's expectations with respect to the size and shape of the teeth in the final prosthetic. FIG. 1B shows a lingual view of the Prosthetic Positioning Assembly 100 shown in FIG. 1A. As shown in FIGS. 1A and 1B, the Prosthetic Positioning Assembly 100 is comprised of two subassemblies: a Maxillary Arch Sub-assembly 101 and a Mandibular Anterior and VDO Pin Sub-Assembly 102.

Figure 1C:
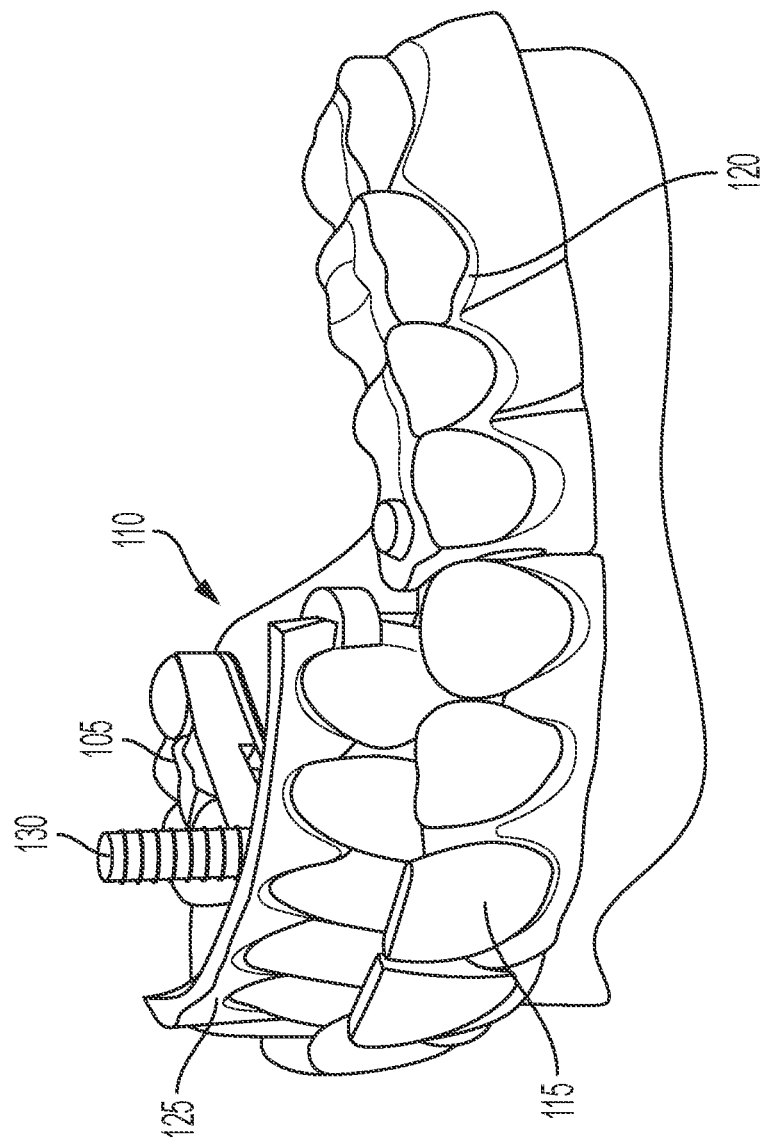
FIG. 1C provides a more detailed view of the components used in the prosthetic positioning assembly, according to some embodiments.

FIG. 1C provides a more detailed view of the components used in the Prosthetic Positioning Assembly 100, according to some embodiments. Note that the image shown in FIG. 1C is oriented "upside down" in relation to human anatomy and the orientations presented in FIGS. 1A and 1B. The Maxillary Arch Sub-Assembly 101 comprises a Maxillary Arch Left Posterior Component 105, a Maxillary Anterior Component 115, and a Maxillary Arch Right Posterior Component 120. These three components function together intra-orally to: determine the incisal edge position, the midline position, the occlusal plane, the buccal corridor, and lip support.

An Occlusal Assembly 110 holds the Maxillary Arch Sub-Assembly 101 in place. As explained in further detail below, the Occlusal Assembly 110 is designed such that the components 105, 115, and 120 of the Maxillary Arch Sub-Assembly 101 are moveable after mounting on the Occlusal Assembly 110. This allows the clinician to adjust the components 105, 115, and 120 as necessary to achieve the desired positioning of the Maxillary Arch Sub-Assembly 101. Once these components 105, 115, and 120 have been placed, the Mandibular Anterior and VDO Pin Sub-Assembly 102 can be placed to assess overall teeth positioning. The Mandibular Anterior and VDO Pin Sub-Assembly 102 comprise the Mandibular Anterior Component 125 and VDO Pin 130. The VDO Pin 130 allows adjustment of the Vertical Dimension of Occlusion ("VDO") to achieve a desired 3D positional relationship between the maxilla and the jaw (i.e., the vertical dimension).

Figure 2A:
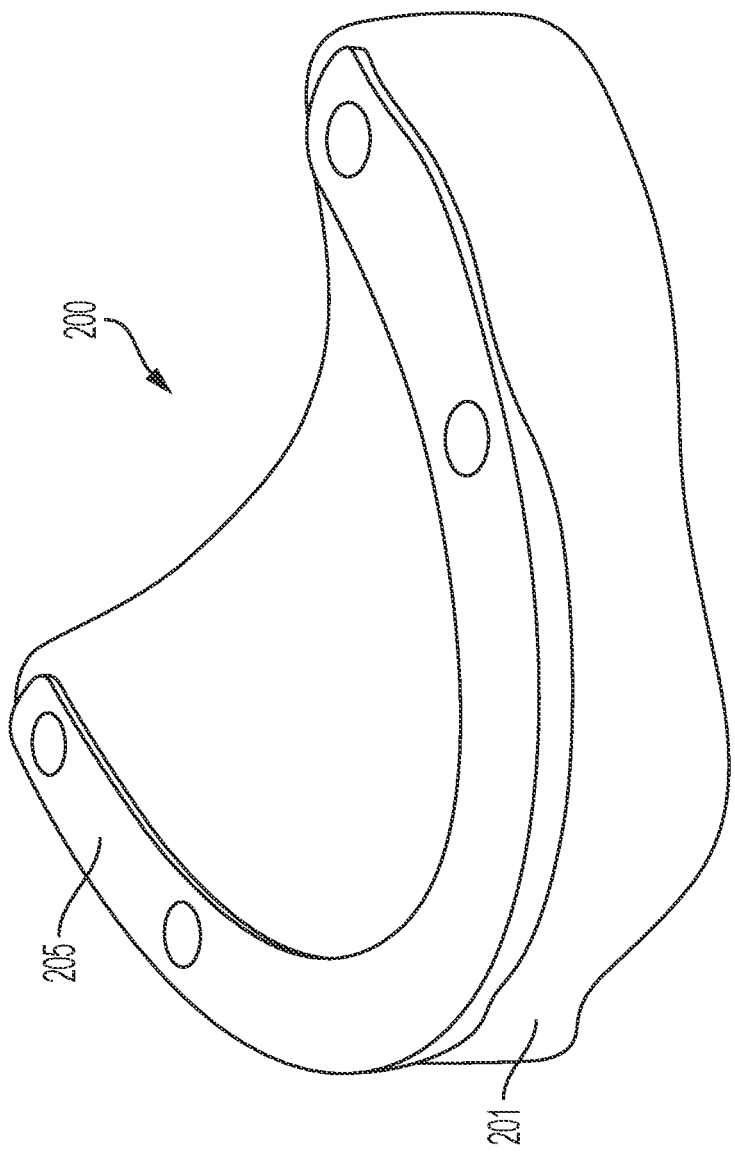
FIG. 2A illustrates a component of the prosthetic positioning assembly, namely a prefabricated horseshoe with incorporated magnets, processed into a custom tray.
Figure 2B:
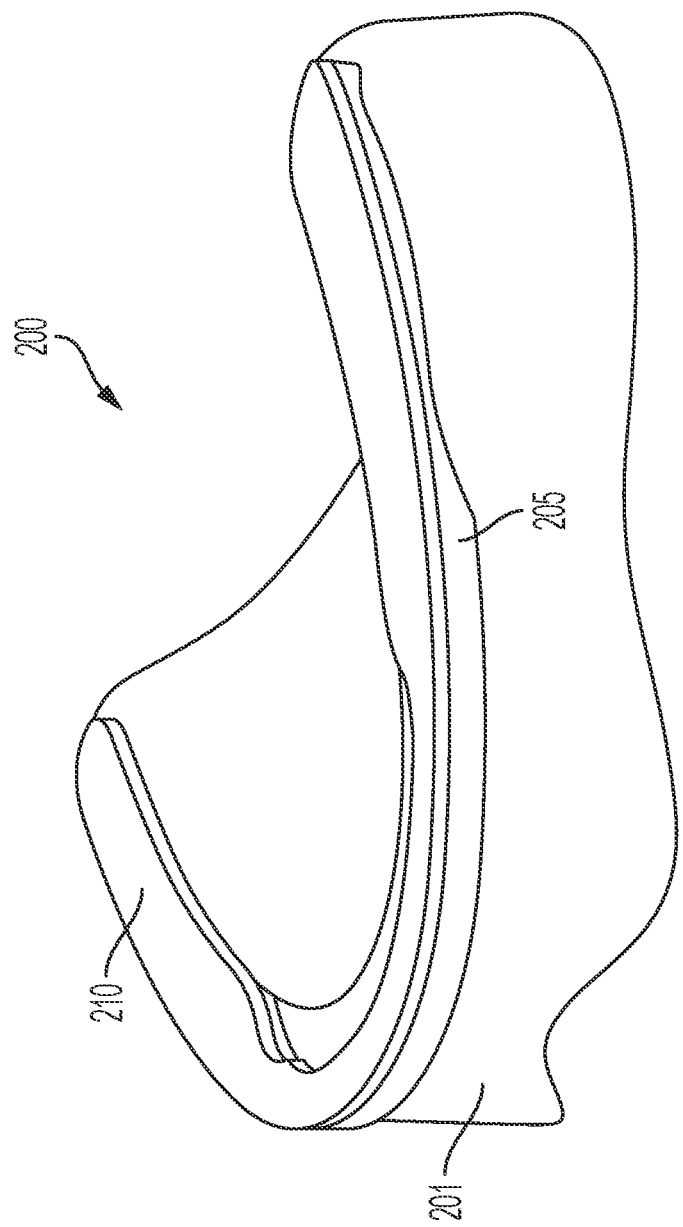
FIG. 2B illustrates a carriage frame which is retained by the magnets incorporated into the lower custom tray, wherein the carriage frame can be moved in order to customize a template to the patient's unique anatomy.

FIGS. 2A and 2B illustrate how the Prosthetic Positioning Assembly 100 can be used in conjunction with an Occlusal Assembly to customize a template to the patient's unique anatomy. The Occlusal Assembly comprises a Maxillary Tray 200 and Carriage Frame Component 210 (illustrated in FIGS. 2A and 2B, respectively). The two parts are designed to function as an adjustable foundation for the Prosthetic Positioning Assembly 100, allowing the clinician to adjust the position of the occlusal plane rapidly and dynamically. The occlusal plane is an important restorative variable in full arch reconstructions because it determines the superior/inferior component of the incisal edge position. The Occlusal Assembly may be provided in the Unity Kit in a variety of sizes (e.g., small, medium, large, etc.) to allow customization to the size of the patient's mouth.

The Maxillary Tray 200 is designed to form to the soft tissue structure of the patient's upper jaw. As shown in FIG. 2A, the Maxillary Tray 200 comprises Moldable Material 201 and an Occlusal Rim Component 205. The Moldable Material 201 can be formed in the mouth of the patient, or on a stone model of the patient's maxilla prior to their appointment. FIG. 2B shows how a Carriage Frame Component 210 may be anchored to the Maxillary Tray 200. As explained in further detail below, in some embodiments, the Carriage Frame Component 210 is fabricated out of a ferromagnetic material and the Occlusal Rim Component 205 includes a plurality of magnets.

Figure 2C:
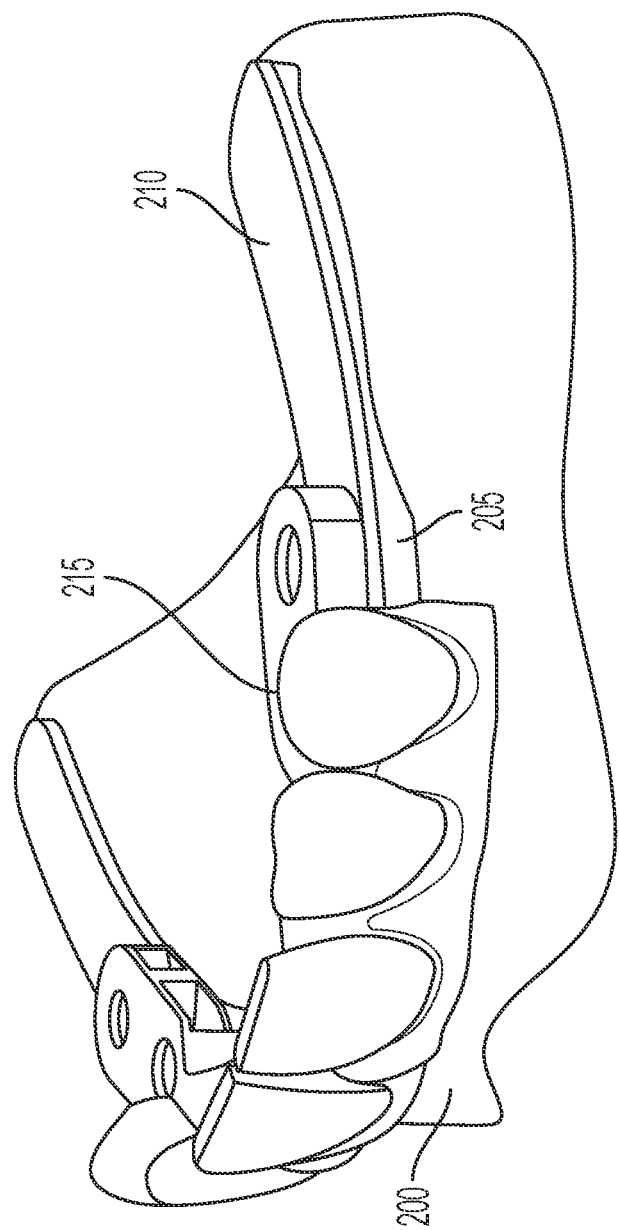
FIGS. 2C-2E shows how the maxillary arch assembly, comprising one anterior segment and a left and right posterior quadrant, can be coupled to the custom maxillary tray with magnets.
Figure 2D:
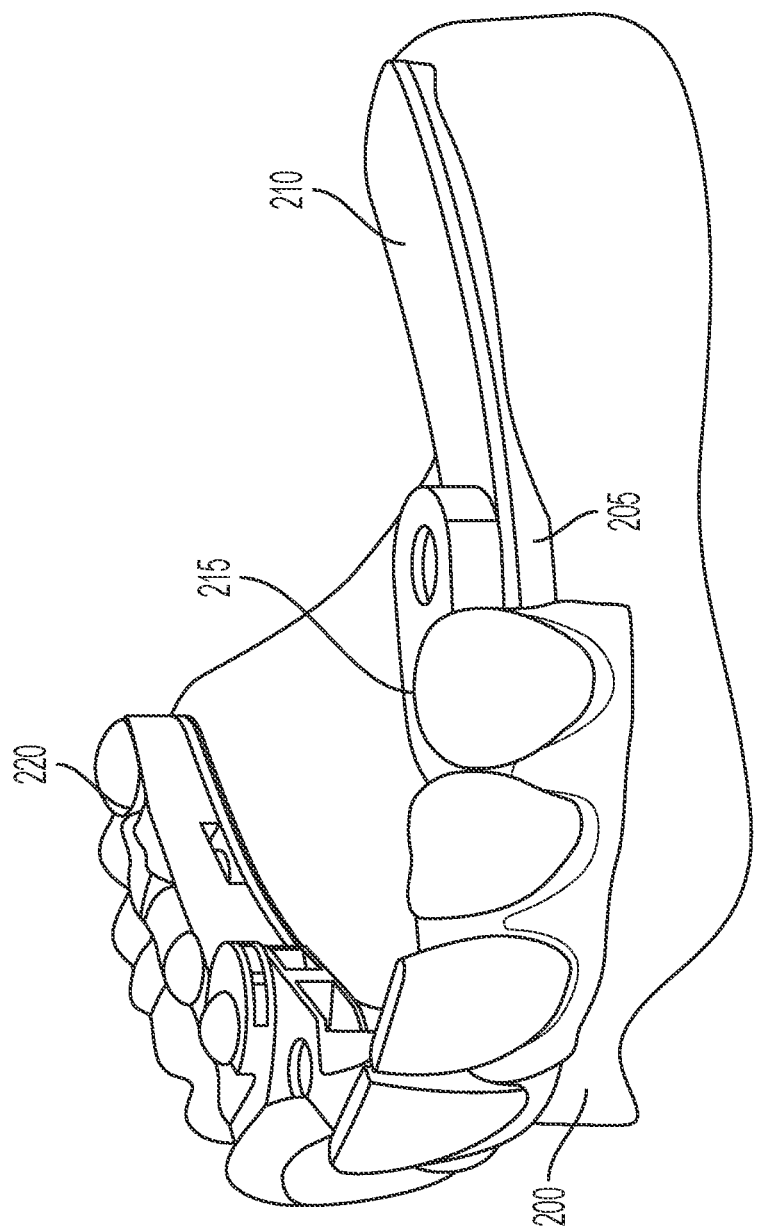
Figure 2E:
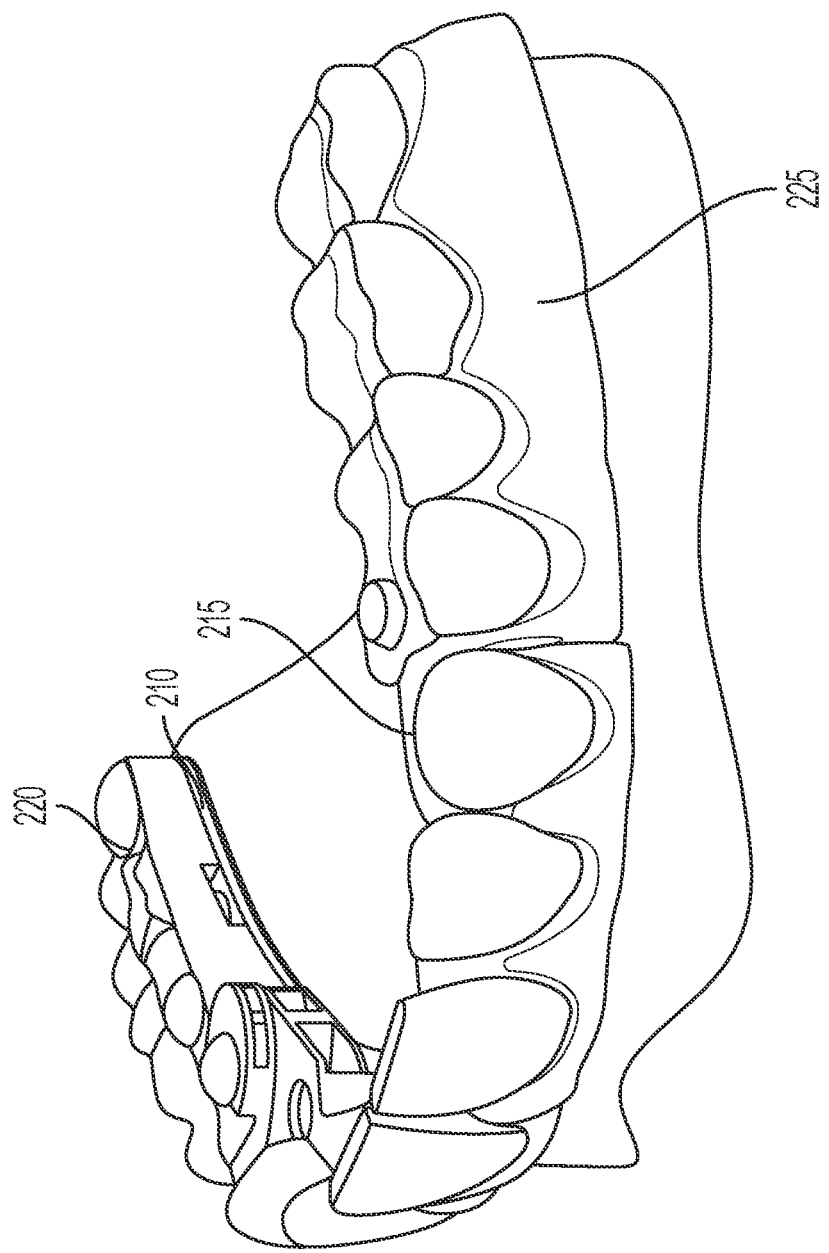

FIGS. 2C-2E show how the Maxillary Arch Sub-Assembly can be coupled to the Occlusal Assembly 110. Starting in FIG. 2C, the Maxillary Anterior Component 215 is anchored to Carriage Frame Component 210. Next, as shown in FIG. 2D, the Maxillary Left Posterior Component 220 anchored to Maxillary Anterior Component 215. Then, the Maxillary Arch Sub-Assembly Component 225 is anchored into position as shown in FIG. 2E. It should be noted that the order in which the components of the Maxillary Arch Sub-Assembly can vary in different embodiments, and the order shown in FIGS. 2C-2E is merely exemplary. The anchoring between the various components may be achieved, for example, using magnetic discs embedded in one or more of the Maxillary Anterior Component 215, the Maxillary Left Posterior Component 220, and the Maxillary Arch Sub-Assembly Component 225.

As is generally understood by those skilled in the art, the shape and position of the maxillary alveolar ridge varies for each patient based on their unique anatomy and the length of time they have been without teeth (referred to as "edentulous"). The width of the maxillary alveolar ridge, also called the "ridge size," is accommodated in the Unity Kit by a plurality of discrete sizes of the Occlusal Assembly. The size of the occlusal assembly (small, medium, large, etc.) will correspond to the size of the maxillary arch assembly. Once the Occlusal Assembly size is selected, the tooth form can be chosen.

Figure 3A:
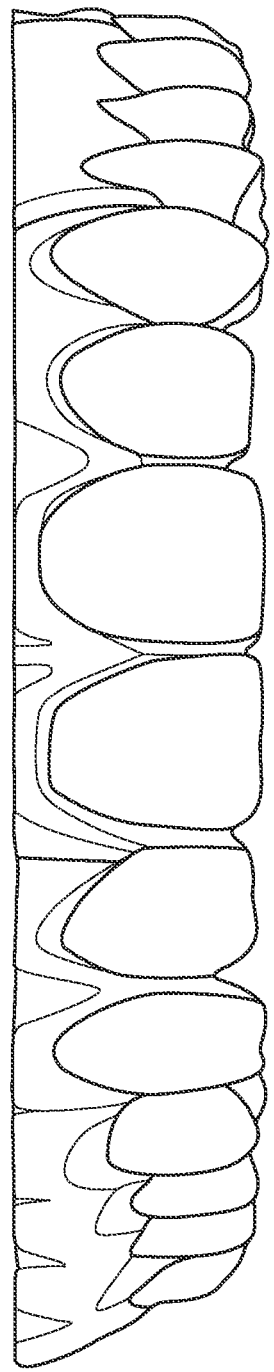
FIGS. 3A and 3B illustrate examples of different tooth forms, available in a library of forms.
Figure 3B:
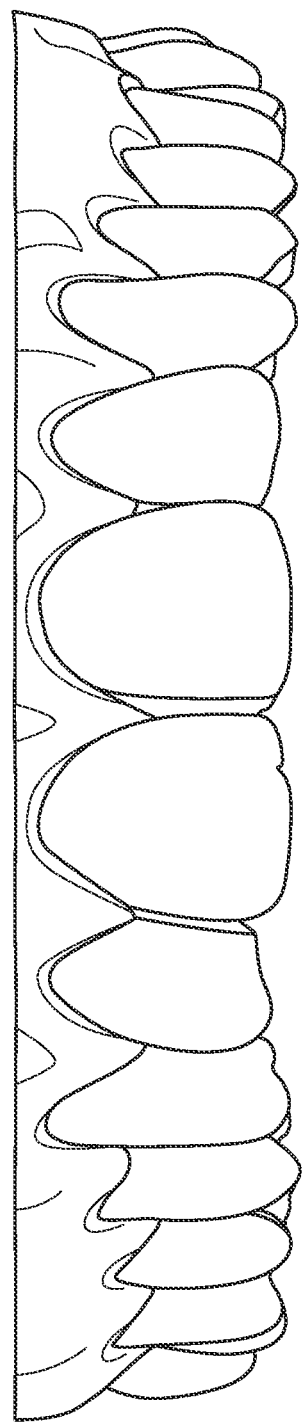

The size and shape of a person's maxillary teeth vary. Facial structure, arch size, and patient personal preferences are considered. Additionally, a patient may have personal preferences regarding how his or her teeth should look. In some embodiments, the Unity Kit provides different tooth forms for each ridge size. For example, for each ridge size, tooth forms may be provided in ovoid, square, and round morphologies. The various shapes may be determined, for example, from natural tooth models. The tooth forms can be rapidly attached or detached from the Carriage Frame 505 chairside during the patient evaluation phase. Additionally, the forms are designed with adjustable posterior components 220 and 225 that function to match the patient's buccal corridor. For illustration, FIGS. 3A and 3B illustrate example square and round tooth forms, respectively.

The ideal position of a person's maxillary teeth relative to the rest of the mouth varies based on many physiological characteristics, including, without limitation, facial structure, lip dynamics, bone anatomy, and phonetics. By combining the Occlusal and Prosthetic Positioning Assemblies, the clinician is able to rapidly position the dental arch in the correct physiological position by adjusting the occlusal plane position, incisal edge position, midline, buccal corridor, lip support, and VDO. The clinician is then able to physiologically verify that position in the mouth using phonetics and lip dynamics, and then adjust the position accordingly. This allows the clinician to create a verified template for the final prosthesis in one chairside appointment.

Figure 4A:
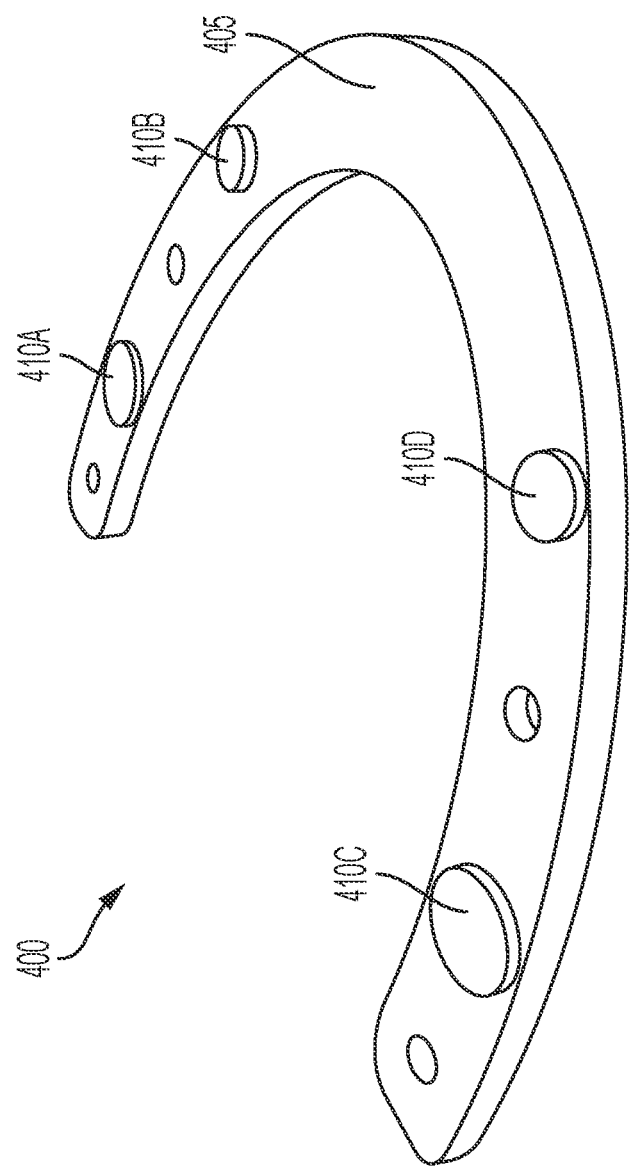
FIGS. 4A and 4B provide further details of how magnets are retained and positioned in the prefabricated horseshoe, according to some embodiments.
Figure 4B:
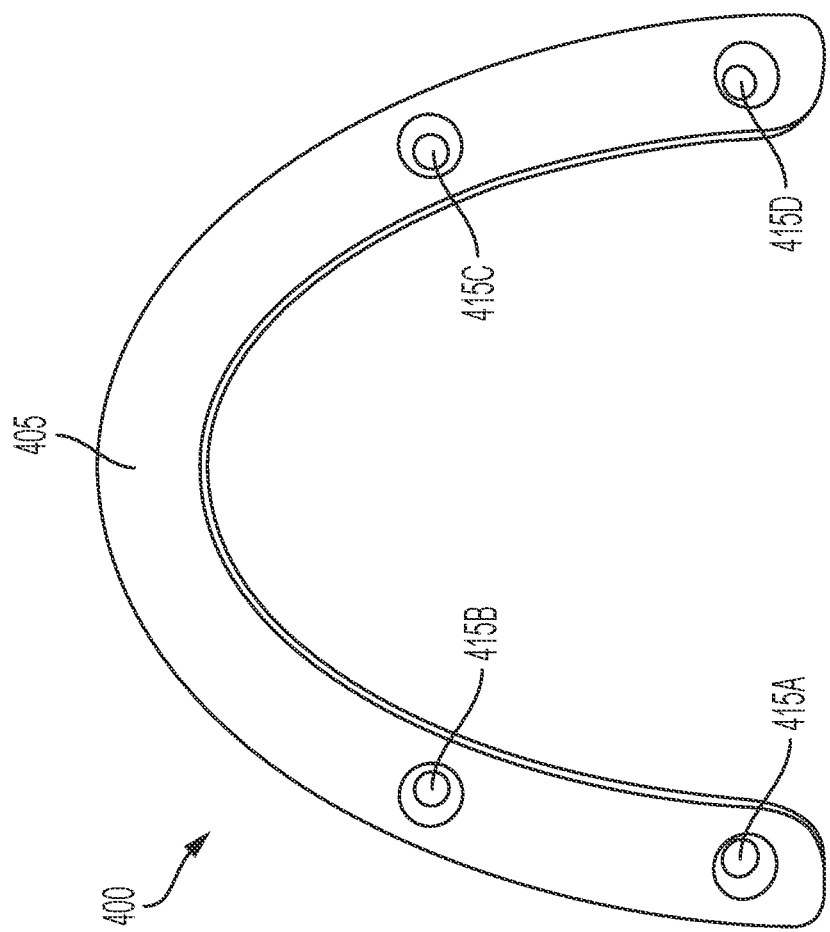

FIGS. 4A and 4B provide further details of the Occlusal Rim Component 205, according to some embodiments. The Maxillary Tray 400 is composed of a rigid Occlusal Rim 405 surrounded by a moldable material. The Occlusal Rim 405 is designed in the shape of a natural dental archform. The Occlusal Rim 405 comprises a plurality of embedded magnetic anchors. In the example shown in FIG. 4A, the anchors include Magnetic Anchors 410A, 410B, 410C, and 410D (i.e., two anchors in the posterior, and two anchors in the anterior). The Magnetic Anchors 410A, 410B, 410C, and 410D, when assembled to Occlusal Rim 405 rim, attract the ferromagnetic Carriage Frame (see, e.g., FIG. 2B) to a mated position. The moldable material may be formed around the occlusal rim, for example, by injection over-molding. As shown FIG. 4B, the Occlusal Rim 405 comprises a plurality of Undercuts 415A, 415B, 415C, and 415D for over-molded material. The moldable material functions to secure the Magnetic Anchors 410A, 410B, 410C, and 410D into the Occlusal Rim 405 and to fit the unique contours of the patient's maxillary alveolar ridge, functioning as a customized final impression and record base.

Figure 5A:
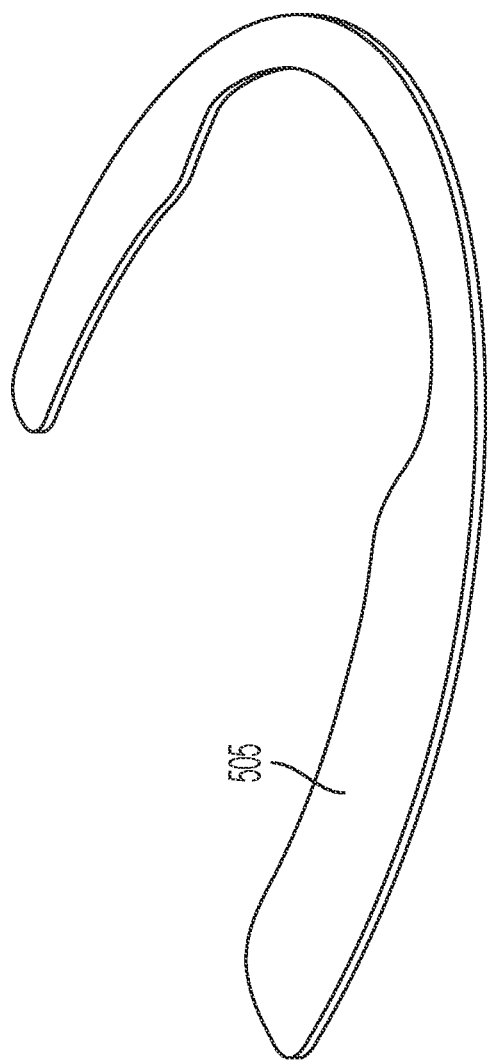
FIGS. 5A and 5B provide a side and occlusal view, respectively, of the carriage frame, according to some embodiments.
Figure 5B:
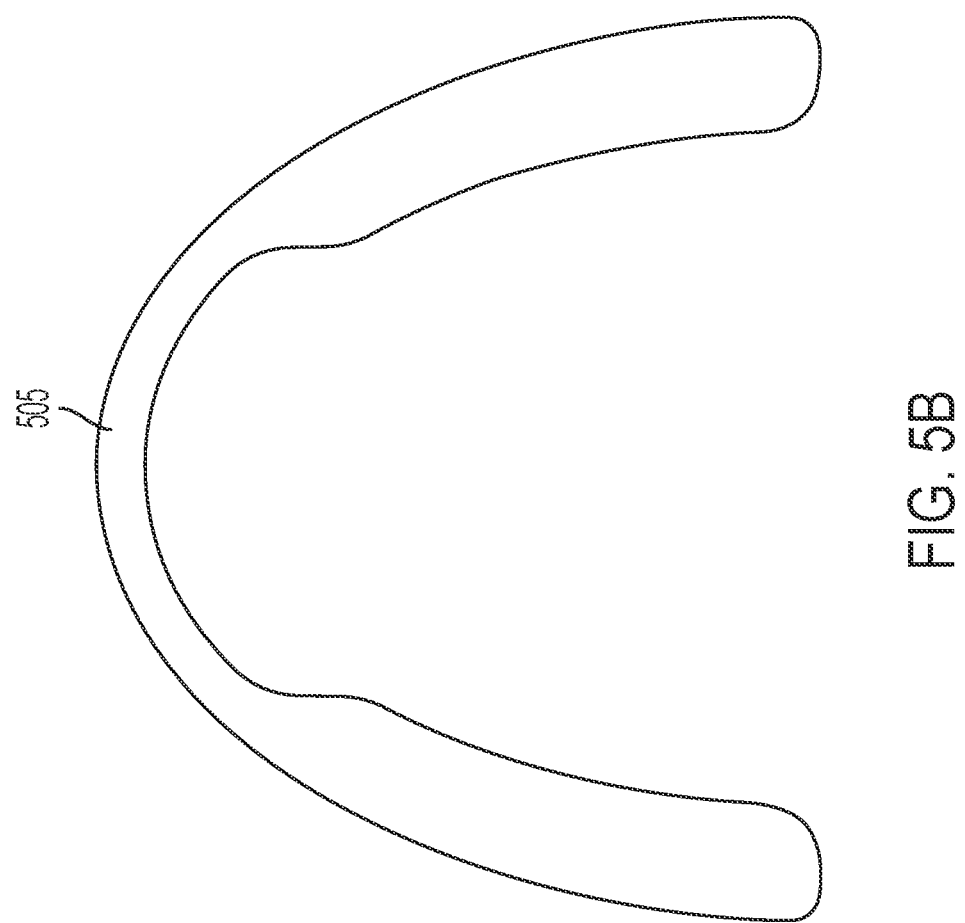

FIGS. 5A and 5B provide a side and occlusal view, respectively, of the Carriage Frame 505, according to some embodiments. The Carriage Frame 505 is composed of a biocompatible magnetic metal material. The Carriage Frame 505 is shaped to mirror the natural dental arch form of the Occlusal Rim 405 with the exception of the lingual anterior area, where the shape may be thinned out. The Carriage Frame 505 is designed to overlap with the magnetic anchors of the maxillary tray (see FIG. 4A) along a linear range of positions. This allows for the Carriage Frame 505 to be adjusted and fixed in any position dependent on the strength and placement of the magnetic anchors. For example, for the Maxillary Tray 400 described above with respect to FIGS. 4A and 4B, the anchors may allow adjustment of up to 6 millimeters in the anterior direction. This functionality allows for "macro adjustment" of the anterior/posterior component of the incisal edge position. Micro adjustments may be carried out by adjustment of the individual components of the Prosthetic Positioning Assembly.

Figure 6B:
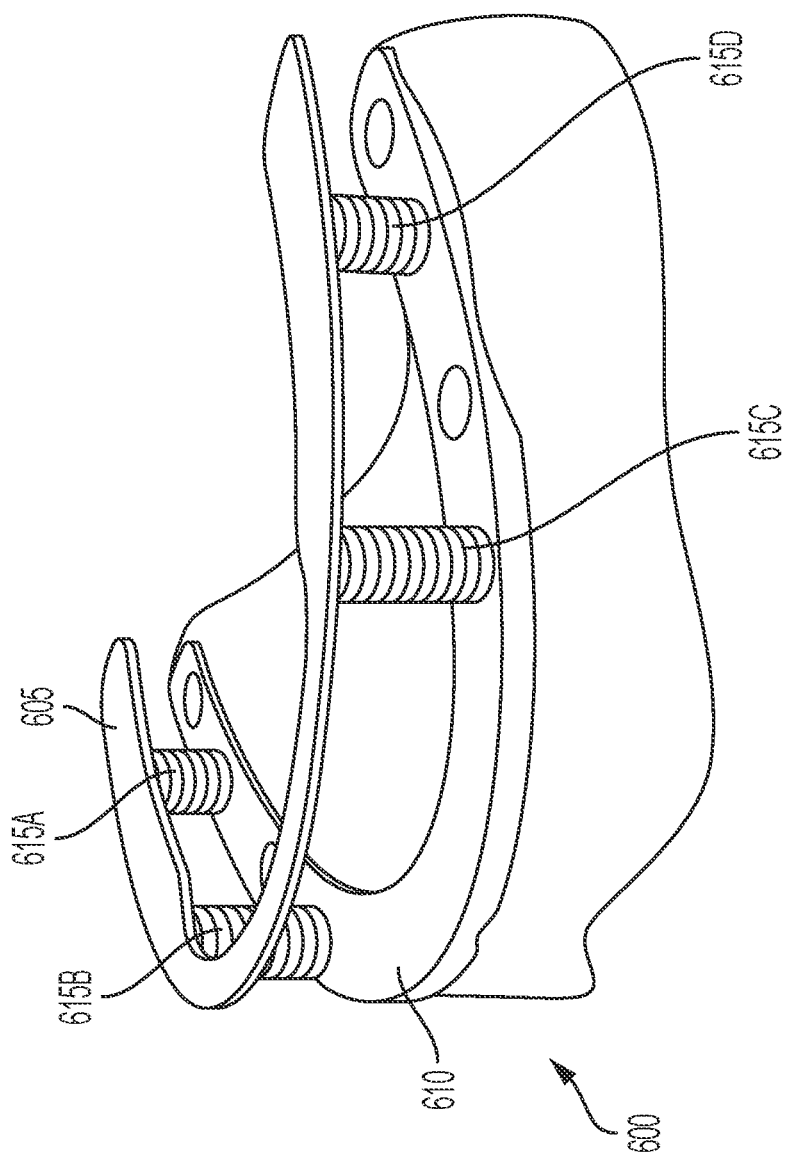

FIGS. 6A and 6B illustrate how Spacers 615A, 615B, 615C, and 615D can be used to adjust the distance between the Carriage Frame 605 and Maxillary Tray 600. In this example, the Spacers 615A, 615B, 615C, and 615D are attracted to the magnetic anchors in the Occlusal Rim 610, which functions to position the spacers in the correct position. The Carriage Frame 605 can be adjusted up and down (superior/inferior) relative to the Maxillary Tray 600 by adding or removing spacers. Additionally, the Carriage Frame 605 becomes angulated by adding additional spacers to the anterior anchors as shown in FIG. 6B. By adjusting the size of spacers individually, any angulation of the Carriage Frame 605 is achievable. The angulation of the Carriage Frame 605 becomes the restorative occlusal plane. Although the example of FIGS. 6A and 6B utilizes magnets as spacers, it should be understood that other types of spacers may be used in other embodiments. For example, in one embodiment, the spacers are stackable plastic discs that "click" into one another to achieve the desired height. The plastic spacers may also include a feature that allows interlocking with the Carriage Frame 605 and the Occlusal Rim 610.

Figure 7A:
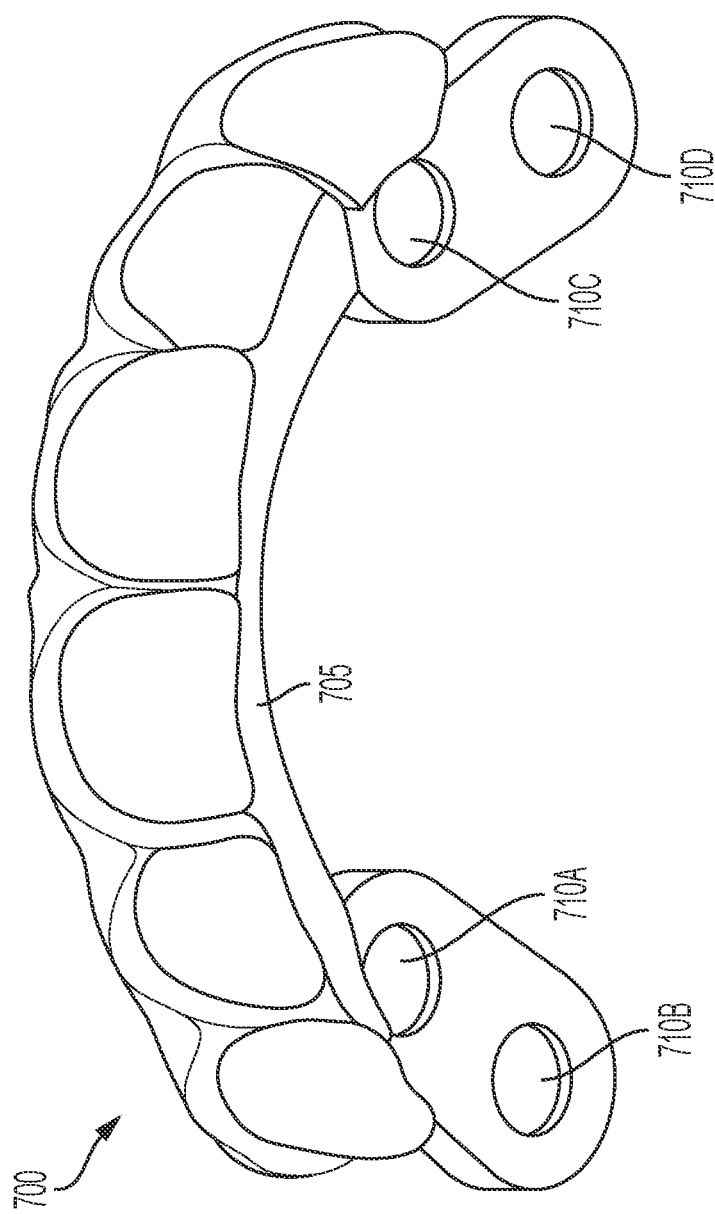
FIGS. 7A and 7B illustrate two different views of the anterior component of the maxillary arch assembly.
Figure 7B:
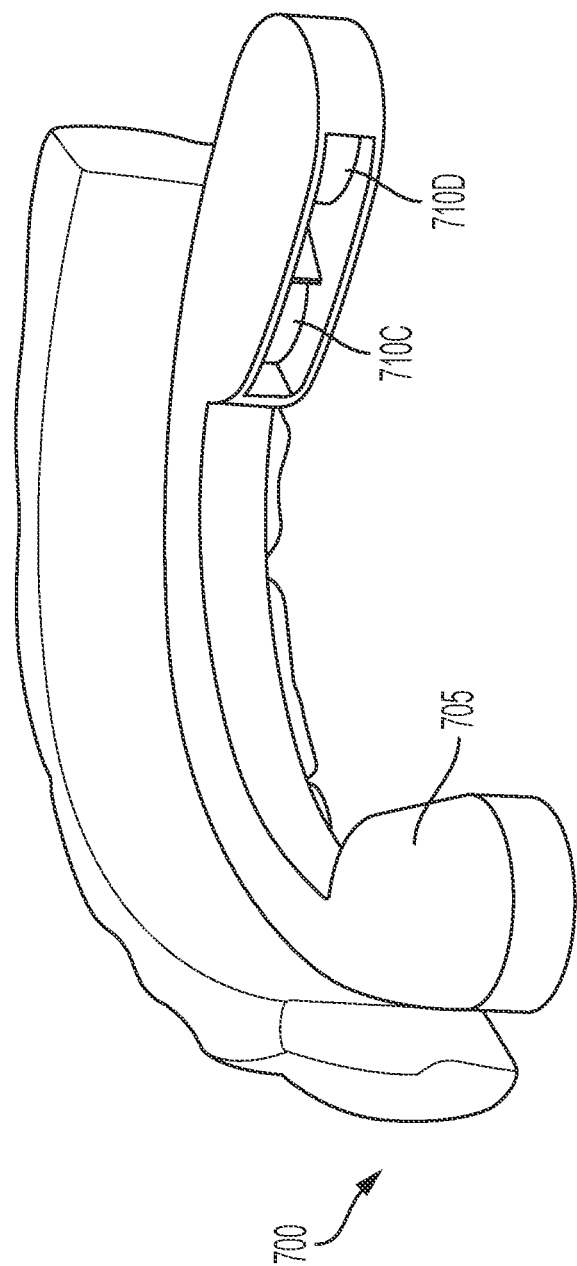
Figure 7C:
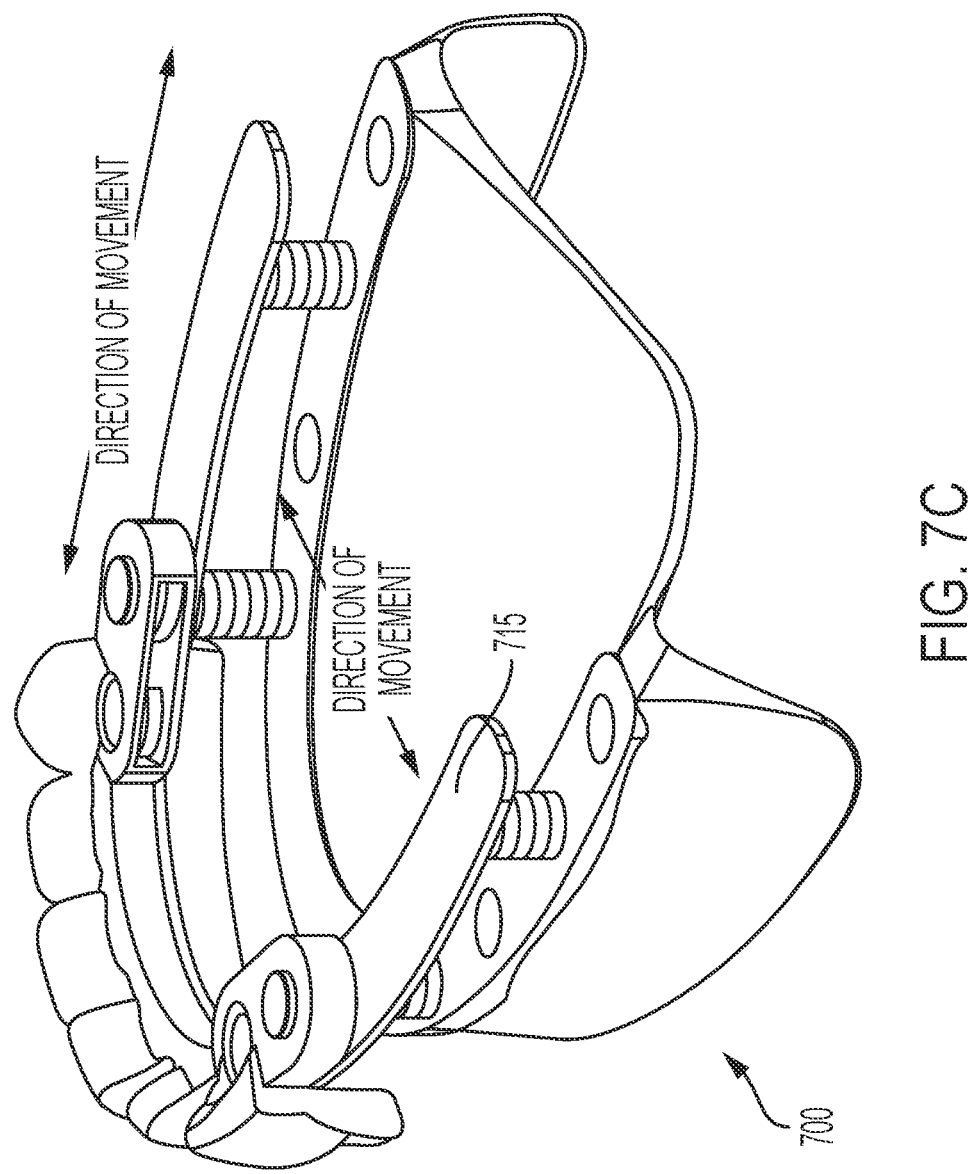
FIG. 7C shows how the maxillary anterior component can be coupled to a carriage frame in a manner that allows adjustment of the maxillary anterior component position.

FIGS. 7A-7C provide additional detail on the maxillary arch sub-assembly, according to some embodiments. Starting with FIGS. 7A and 7B, two different views of the Maxillary Anterior Component 700 are illustrated. The Maxillary Anterior Component 700 contains the facial and occlusal contours of 6 maxillary anterior teeth, along with a Crescent Shaped Protrusion 705 from the lingual aspect of the teeth. The Crescent Shaped Protrusion 705 contains spaces for Magnets 710A, 710B, 710C, and 710D (or other connectors) of various sizes to be placed. FIG. 7C shows how the Maxillary Anterior Component 700 can be magnetically coupled to a Carriage Frame 715 in a manner that allows adjustment of the Maxillary Anterior Component 700's position.

Figure 8A:
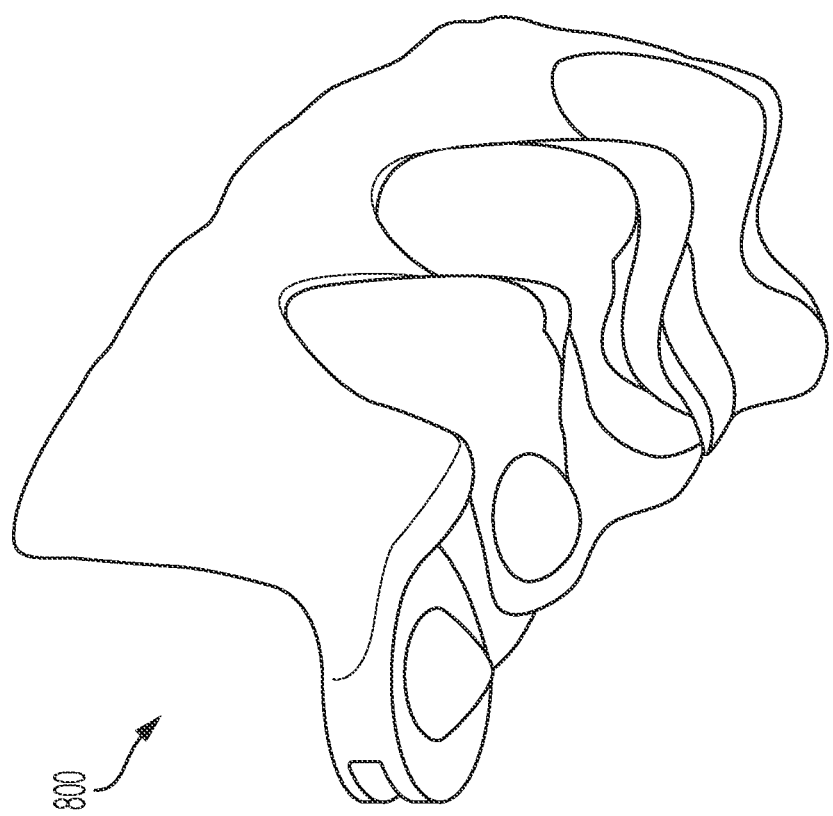
FIGS. 8A-8C show three views of the maxillary right posterior component.
Figure 8B:
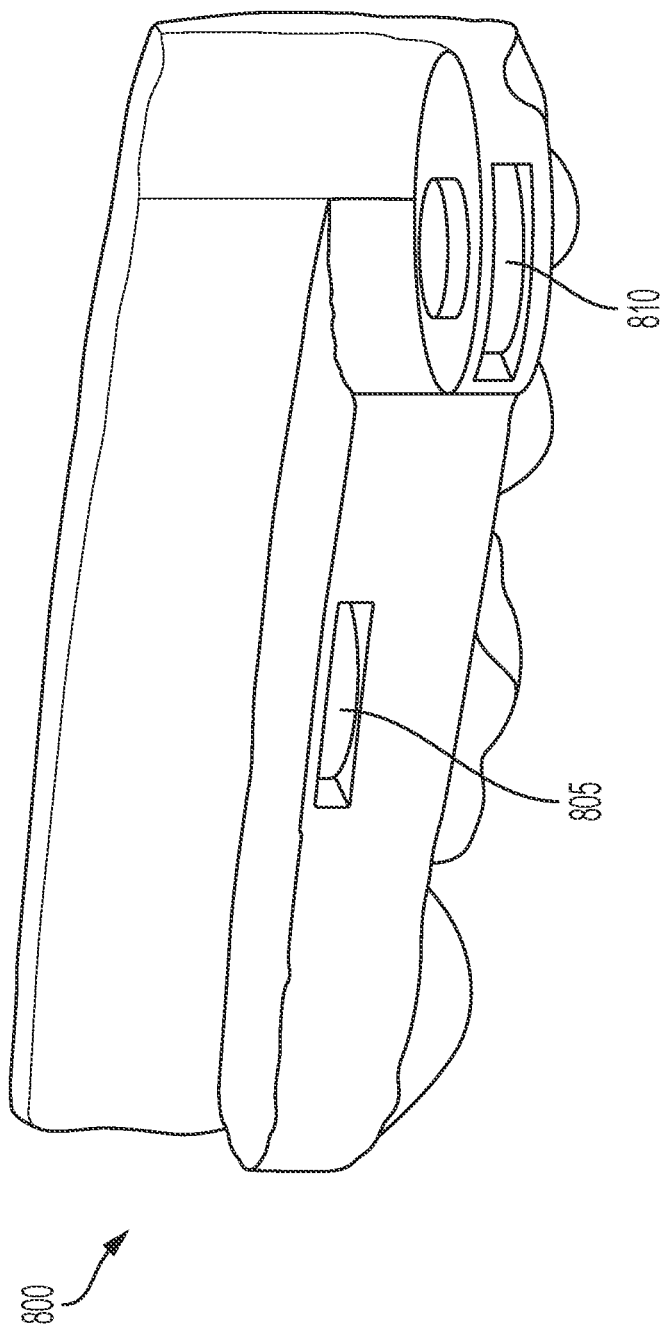
Figure 8C:
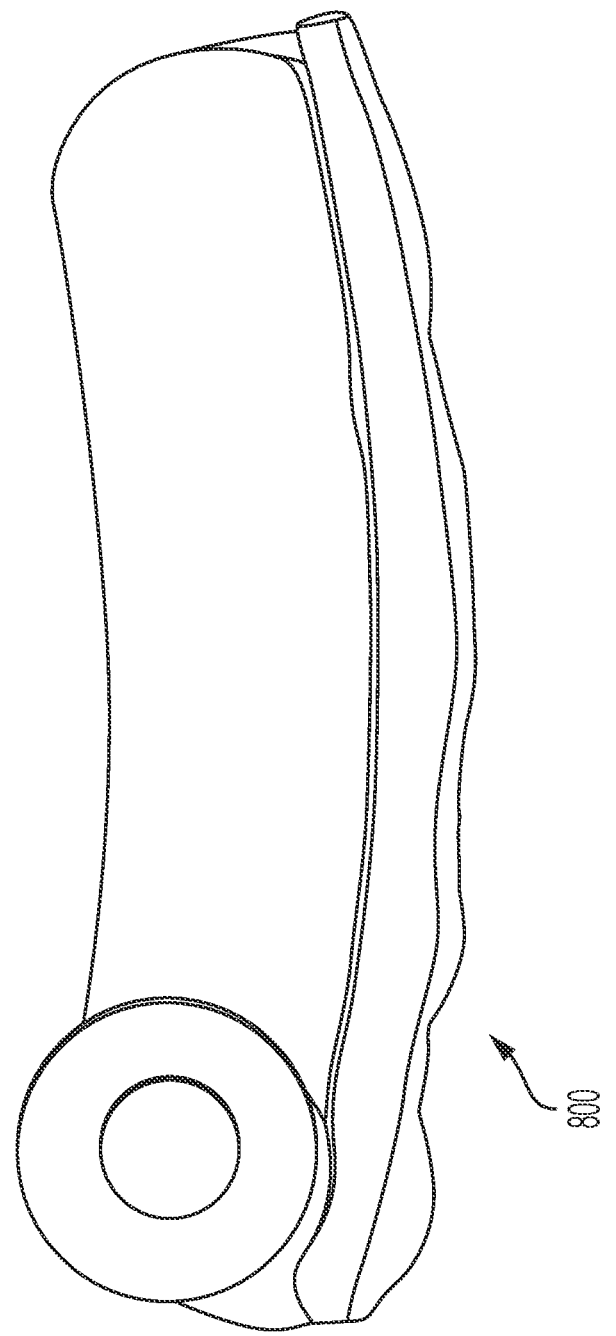

FIGS. 8A-8C show three views of the Maxillary Left Posterior Component 800. Specifically, FIG. 8A shows an occlusal and buccal view, while FIGS. 8B and 8C show a lingual and top view, respectively. The Maxillary Right Posterior and the Maxillary Left Posterior Components are mirror images of each other. The Maxillary Right and Left Posterior Components each contain the buccal and occlusal contours of 4 posterior teeth. The lingual aspect of the parts contain a flat surface, a round surface, and spaces for Magnets 805 and 810 (or other connectors) of various sizes to be placed.

Figure 9A:
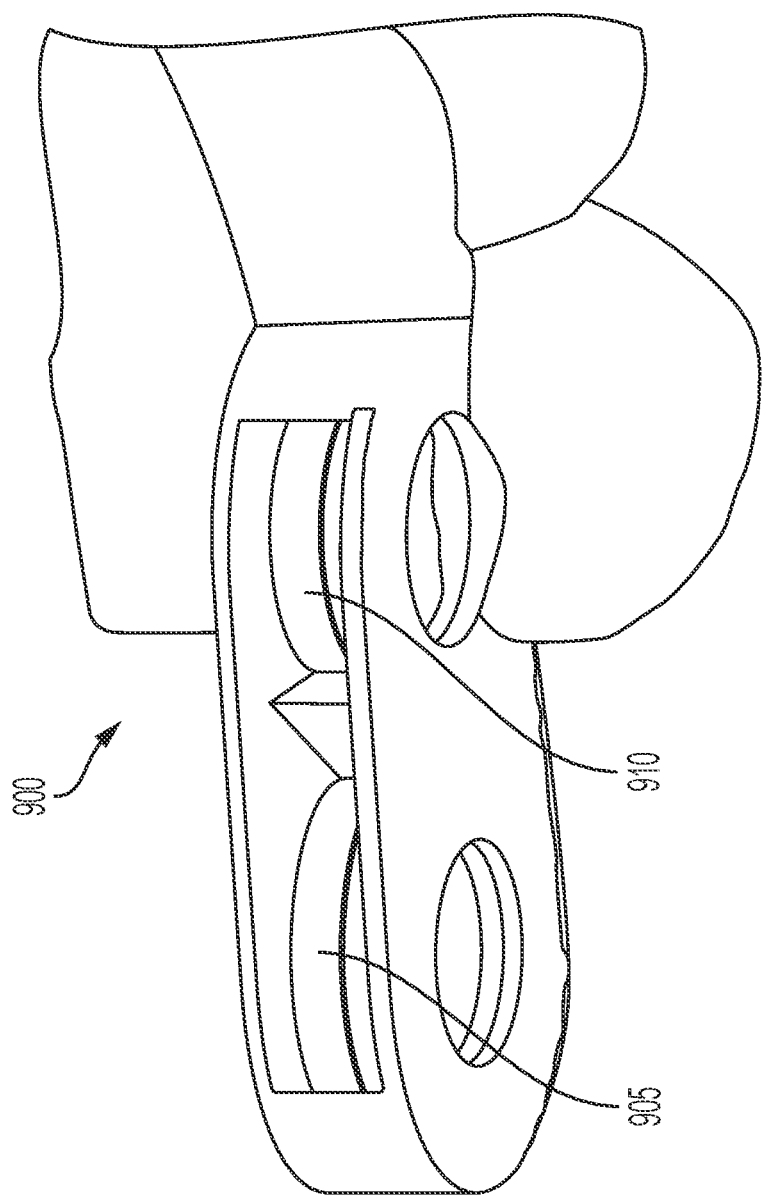
FIG. 9A shows example magnetic anchors on the maxillary anterior component for connecting to both the posterior quadrants and the carriage frame.
Figure 9B:
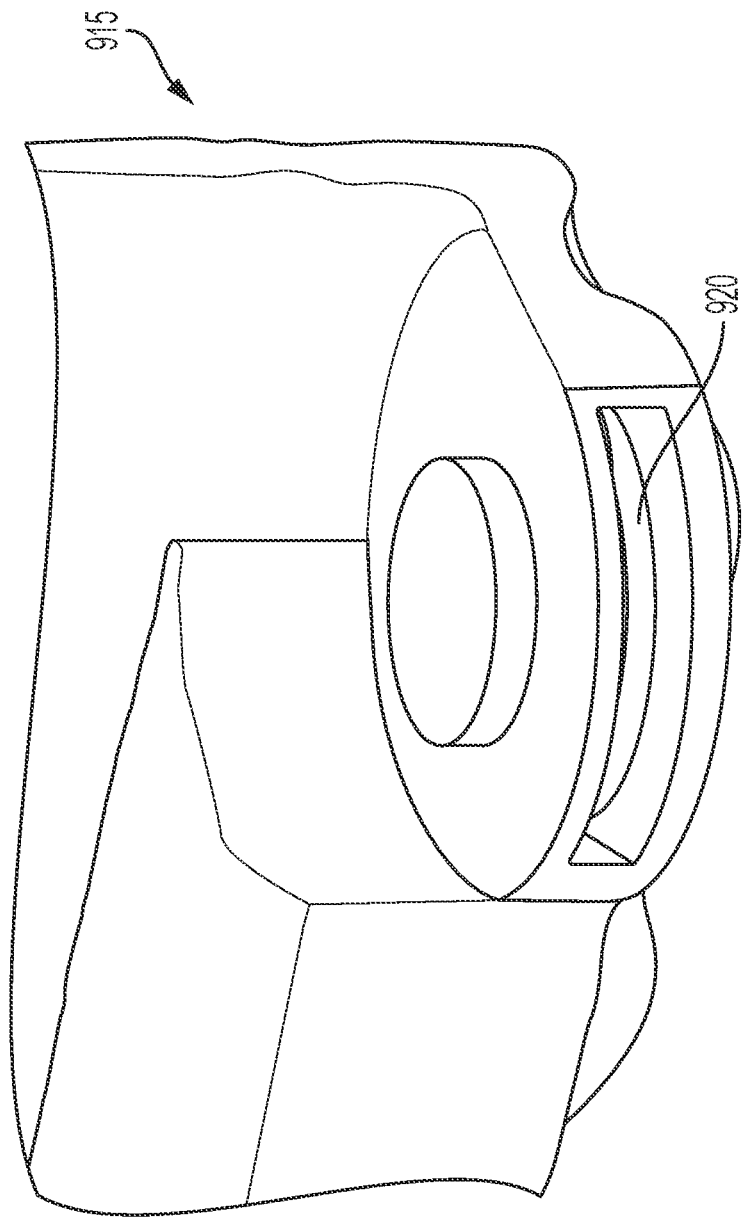
FIG. 9B shows the magnet anchor on the maxillary right posterior component.

In some embodiments, the Maxillary Right Posterior and the Maxillary Left Posterior Components connect to the Maxillary Anterior Component using a combination of magnetic anchors, located at the lingual of the first bicuspids on all 3 parts. The anchor allows for rotation of the part along the occlusal plane. This design feature enables adjustment of the left and right posterior buccal corridor while preserving the occlusal plane. The magnetic anchor may also be designed to restrict rotation to desired ranged (e.g., +/−10 degrees) from the baseline arch form. FIG. 9A shows example magnetic Anchors 905, 910 on the Maxillary Anterior Component 900 for connecting to the posterior assemblies. FIG. 9B shows the magnet Anchor 920 on the Maxillary Left Posterior Component 915. The Maxillary Right Posterior anchor (not shown) is a mirror image of the Maxillary Left Posterior Anchor 920.

The Maxillary Arch Sub-Assembly is designed to magnetically anchor to the Carriage Frame part of the Occlusal Assembly, which functions as a base. The anchors connecting the posterior parts may be repurposed to attract the Maxillary Arch Sub-Assembly securely to the Carriage Frame in a way that limits movement. As a result, the Maxillary Arch Sub-Assembly may be adjustable only in the occlusal plane set by the Occlusal Assembly. The Maxillary Arch Sub-Assembly can be shifted to the unique midline position and adjusted forward to the ideal incision edge and lip support positions.

Figure 10A:
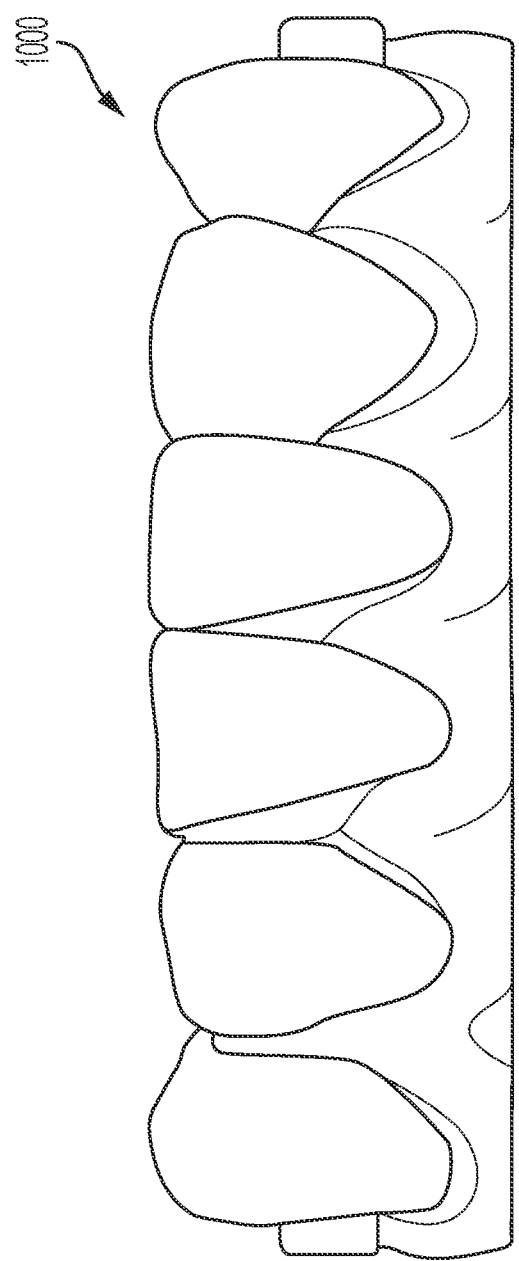
FIGS. 10A-10C provide three views of the mandibular anterior component, according to some embodiments.
Figure 10B:
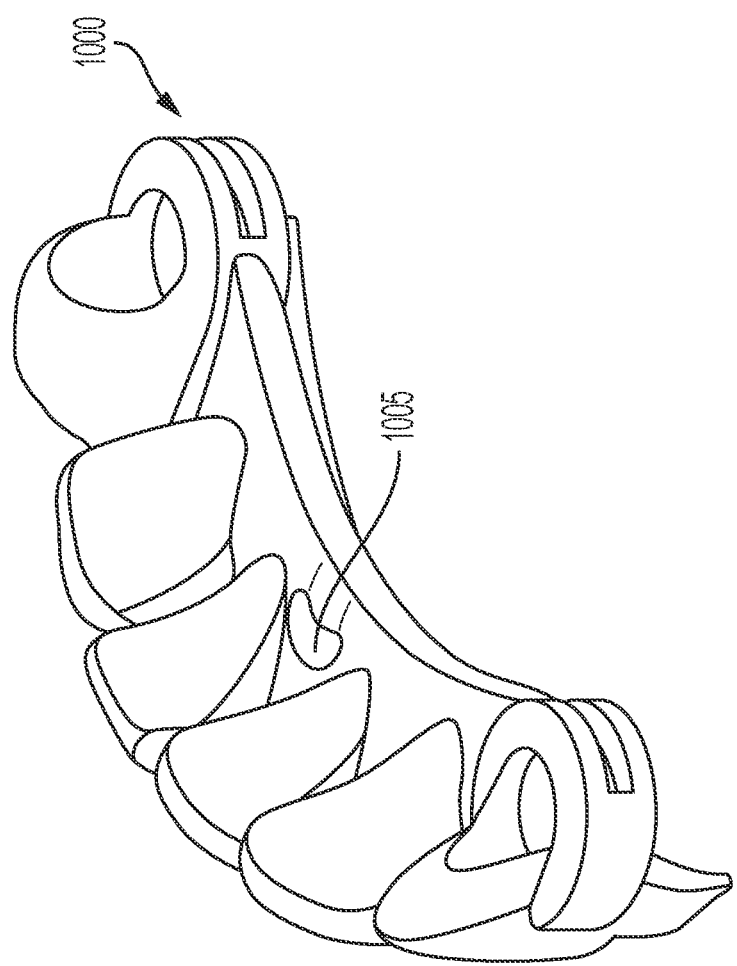
Figure 10C:
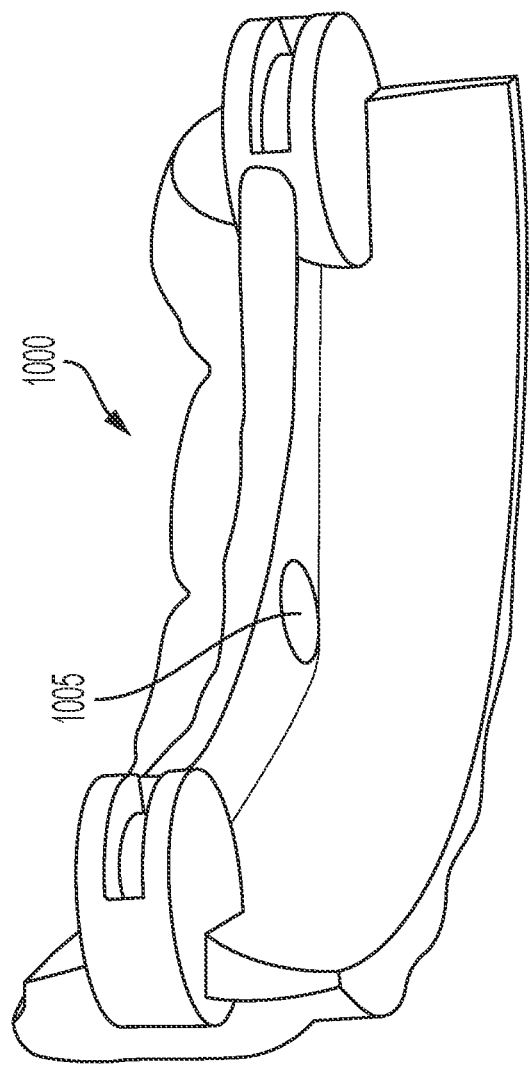

FIGS. 10A-10C provide three views of the Mandibular Anterior Component 1000, according to some embodiments. In this example, the Mandibular Anterior Component 1000 is designed to have the lower 6 anterior teeth. As shown in FIGS. 10B and 10C, the Mandibular Anterior Component 1000 includes an Aperture 1005 for receiving the VDO Pin.

Figure 11A:
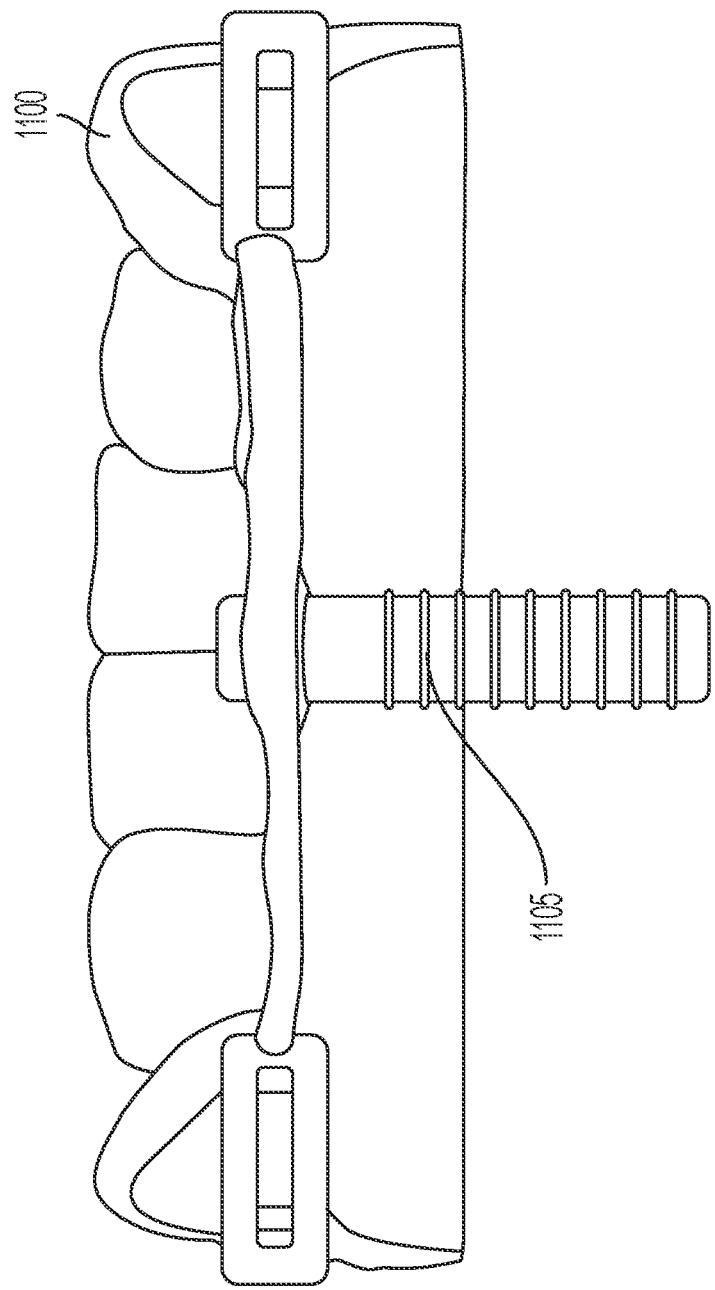
FIGS. 11A and 11B show how a VDO pin connects to a mandibular anterior component, according to some embodiments.
Figure 11B:
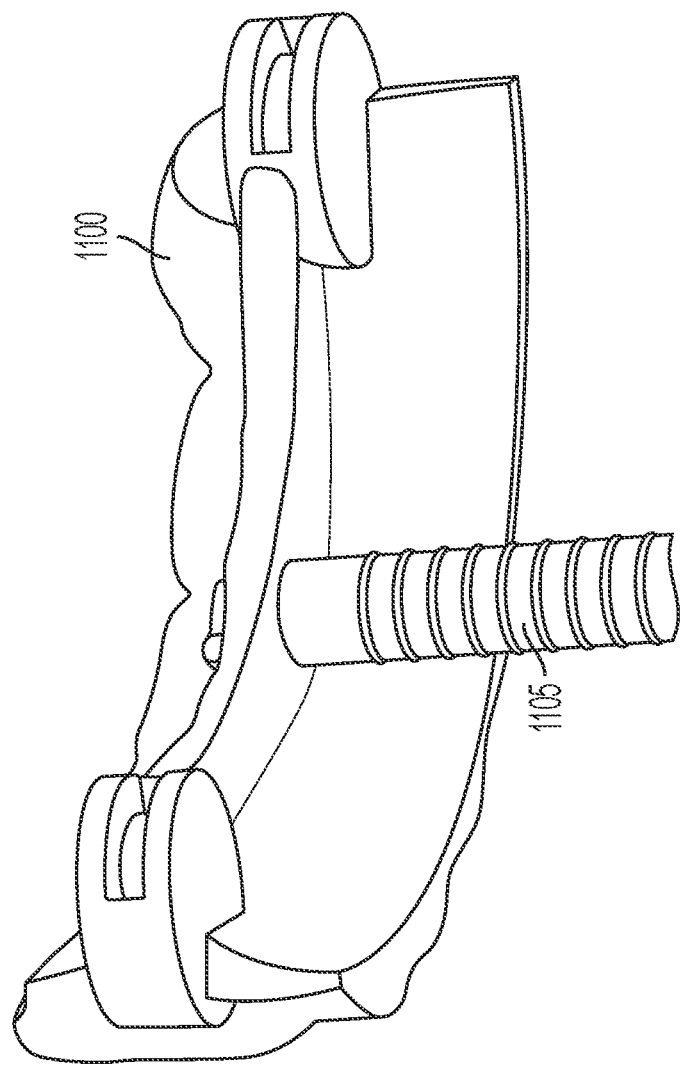

FIGS. 11A and 11B show how a VDO Pin 1105 connects to a Mandibular Anterior Component 1100, according to some embodiments. The VDO Pin 1105 connects to the intaglio (tissue side) of the Mandibular Anterior Component 1100. This VDO Pin 1105 provides the clinician with the capability to adjust the VDO, a critical restorative variable in full arch reconstructions. More specifically, the VDO Pin 1105 is designed to be shortened by the clinician chairside (e.g., using a dental hand-piece) to achieve the correct VDO. In some embodiments, the VDO Pin 1105 has markings at pre-determined spacing (e.g., 1 mm) denoting the distance from the occlusal plane.

In some embodiments, the Mandibular Anterior Component connects to the Maxillary Anterior Component using magnetic spacers and corresponding magnetic anchors embedded into both parts. The anchors are located lingually of the maxillary and mandibular canines and function to restrict all movement of the Mandibular Anterior Component relative to the Maxillary Anterior Component. The spacers function to connect the Mandibular Anterior Component and Maxillary Anterior Component and preserve the inter-occlusal distance between the two parts when mated and represent the positioning of the entire lower arch as it relates to the teeth in the upper arch in the ideal occlusal relationship.

Figure 12B:
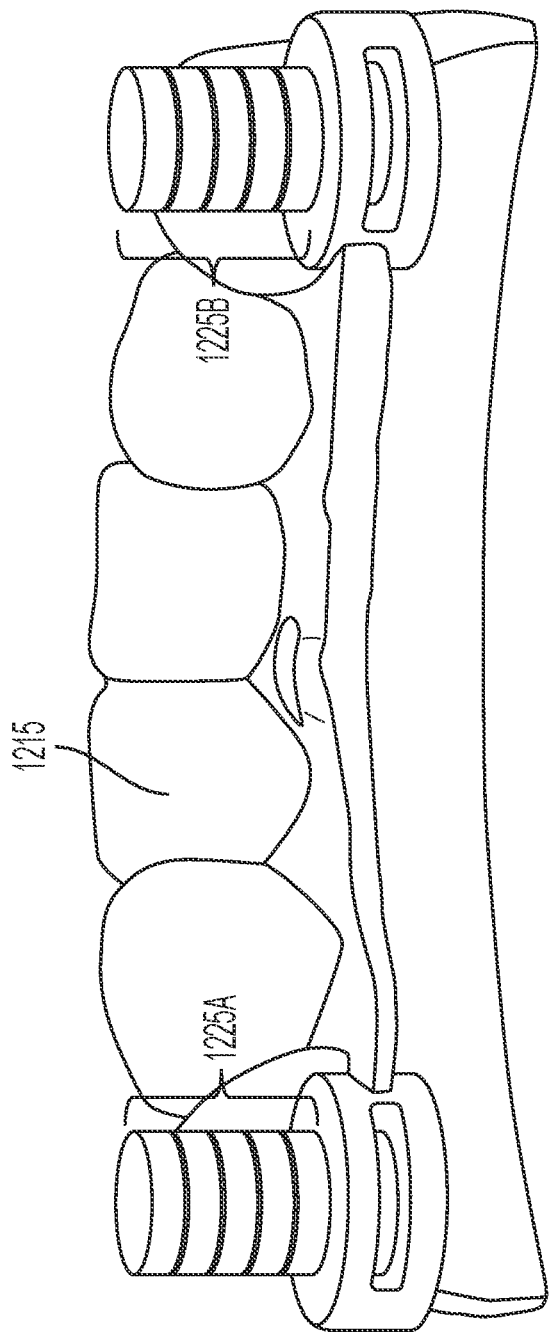
Figure 12C:
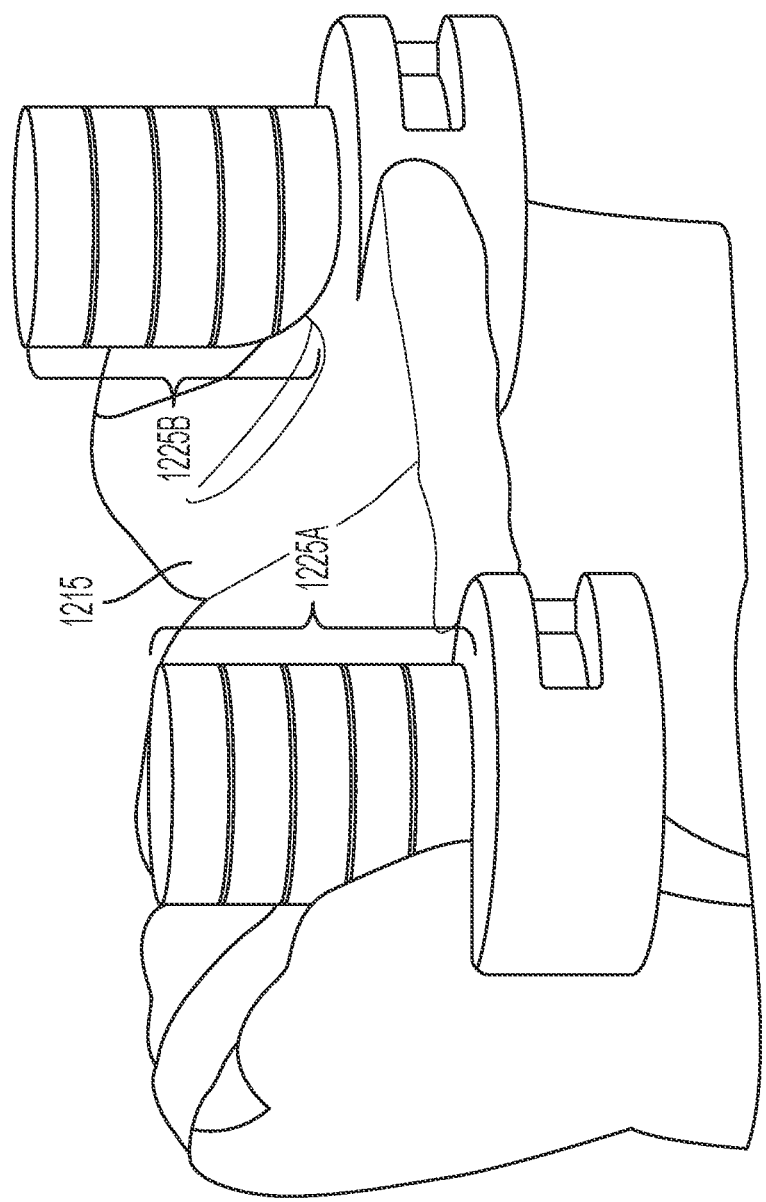
Figure 12D:
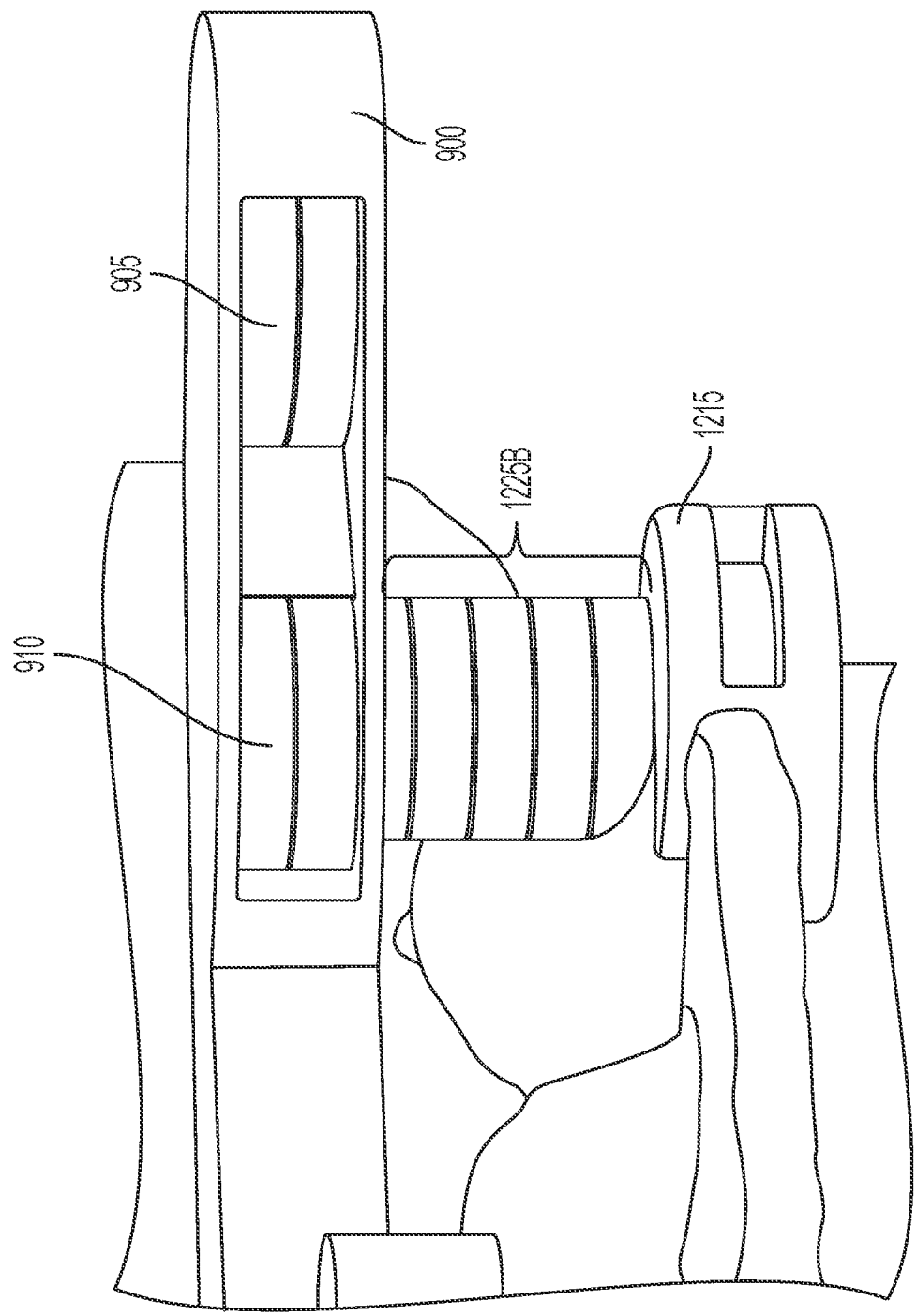

FIGS. 12A-12D illustrate the process of connecting the Mandibular Anterior Component 1215 to the Maxillary Anterior Component 900 discussed above with reference to FIGS. 9A and 9B. The Maxillary Anterior Component 900 connects to Mandibular Anterior Component 1215 by inserting the Anchors 95 into Space 1220 shown in FIG. 12A. FIG. 12B shows the Mandibular Anterior Component 1215 with Spacers 1225A and 1225B. FIG. 12C shows the Buccal and Lingual view of Spacers 1225A and 1225B on Mandibular Anterior Component 1215. Finally, FIG. 12D shows the location of Anchors 905 and 910 when the Mandibular Anterior Component 1215 and the Maxillary Anterior Component 900 are anchored together.

Figure 13:
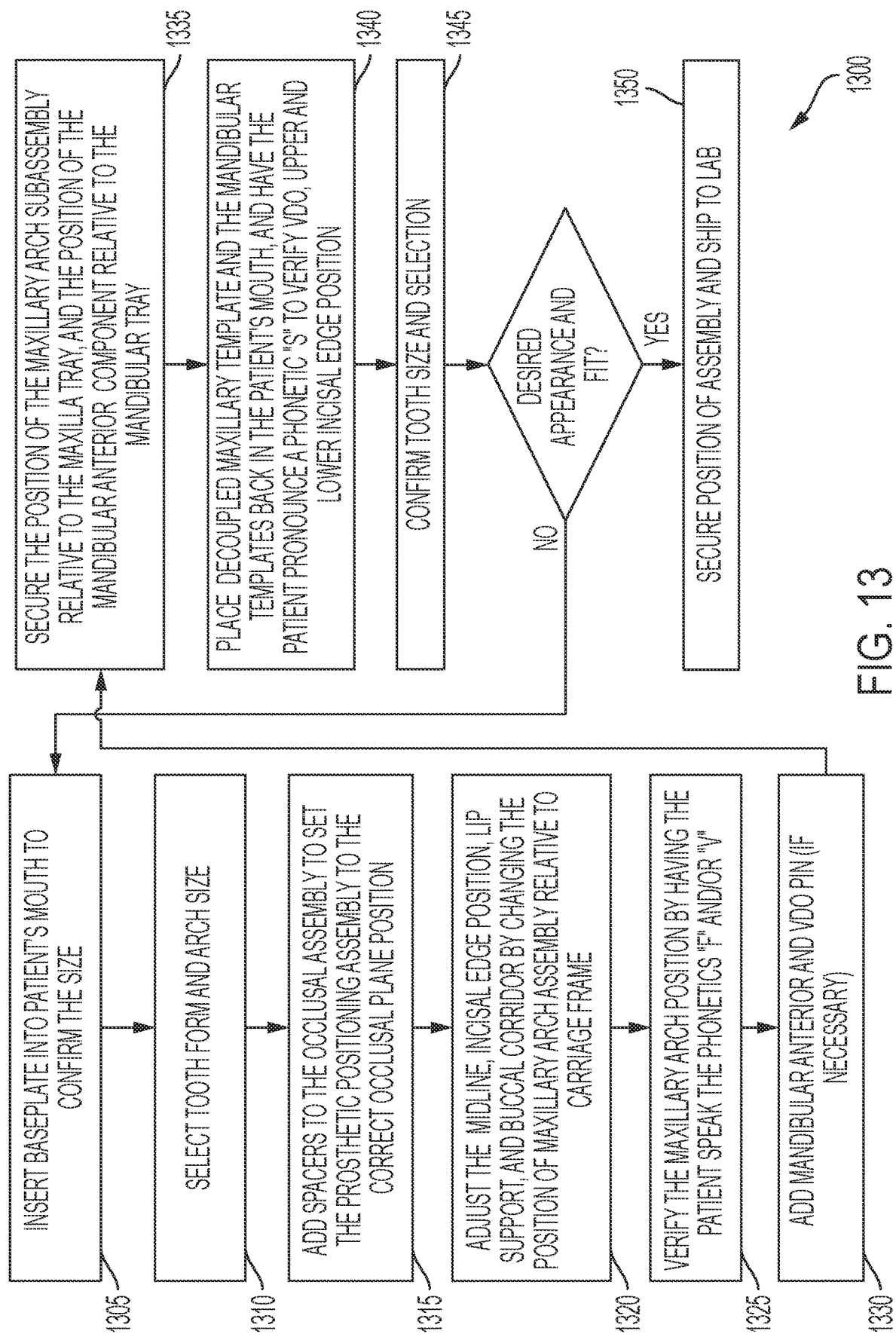
FIG. 13 provides a flowchart that illustrates the order of operations for template customization, according to some embodiments.

FIG. 13 provides a flowchart that illustrates the order of operations for template customization, according to some embodiments. Starting at step 1305 a customized patient specific baseplate is inserted in the patient's mouth and evaluated for retention and stability. A plurality of baseplates may be provided with the Unity Kit in a variety of sizes. At step 1310, the clinician selects a tooth form and arch sizes from a library, appropriate to the patient specific conditions and preferences. Additionally, the clinician assembles the carriage frame and maxillary arch components. Next, at step 1315, the clinician adds spacers to the occlusal assembly as required to achieve the correct occlusal plane and incisal edge position. At Step 1320, if needed, the clinician may also shift the carriage frame forward or back and the arch assembly may be shifted forward or back and side to side in relation to the carriage frame in order to establish midline, lip support and buccal corridor. Then, at step 1325, with all parameters now set, the clinician verifies the maxillary arch position by having the patient speak the phonetics "F" and/or "V." If necessary, the clinician adjusts the maxillary arch position.

Continuing with reference to FIG. 13, at step 1330, the mandibular anterior and the VDO pin (if necessary) is added. If necessary, the clinician adjusts the VDO. For example, in some embodiments, the VDO is calculated by subtracting the "freeway space" from the vertical dimension of rest ("VDR"). As is generally understood in the art, when the mandible is in a rest position, there is a space between the upper and lower teeth. The interocclusal space observed in the premolar region is the "freeway space." In other embodiments, where dentures are being designed for replacement purposes, the VDO may be matched to the VDO of the existing dentures. The positioning of the VDO may also be influenced by patient facial aesthetics. At step 1335, the clinician secures the position of the maxillary arch subassembly relative to the maxilla tray, and the position of the mandibular anterior component relative to the mandibular tray using, for example, flowable, curable material.

At step 1340, once the maxillary and mandibular components have been secured to the maxillary and mandibular trays, the clinician removes the spacers to decouple the maxillary assembly from the mandibular assembly. The maxilla and mandible are now free to move independent from one another. With the lower anterior now fixed in the correct position, the clinician then has the patient pronounce a phonetic "S" to verify VDO, upper and lower incisal edge position. The clinician then has the patient smile at step 1345 to confirm tooth size and selection. The process 1300 can then be restarted if a change in the arch form, tooth form, or intra-oral position is desired. Once the desired appearance and fit has been achieved, at step 1350, the clinician can utilize a chairside scanner to capture the position of the maxillary and mandibular assemblies or alternatively, the full assembly can be articulated and shipped to the lab for manufacture.

Figure 14:
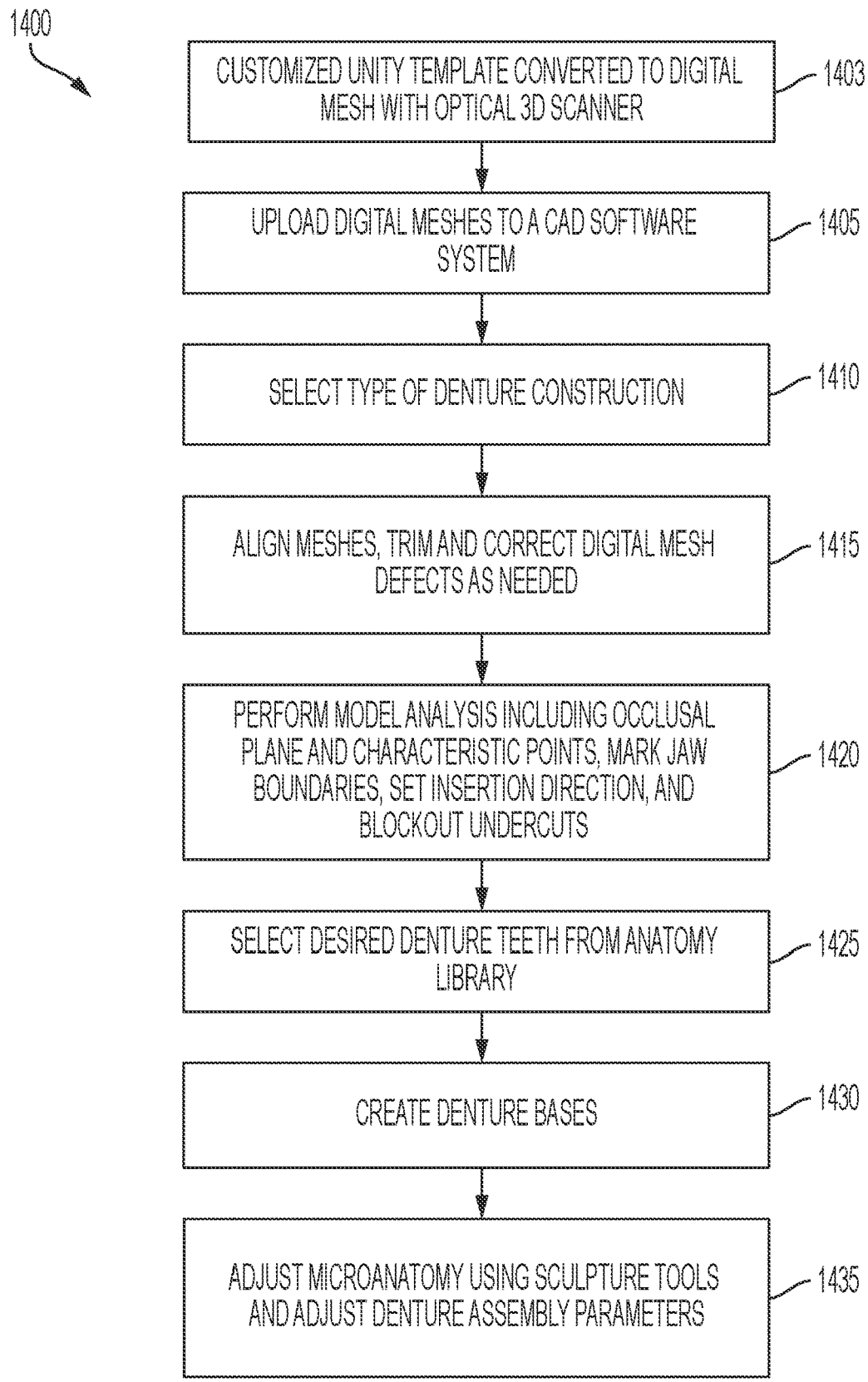
FIG. 14 provides a method that describes how the verified Unity template may be turned into an interim trial denture, according to some embodiments.

FIG. 14 provides a method 1400 that describes how the customized Unity template may be turned into an interim trial denture, according to some embodiments. Starting at step 1403, a customized unity template is converted to a digital mesh with an optical 3D scanner. At step 1405, a plurality of digital meshes is uploaded to a computer assisted design (CAD) software system. Example CAD software systems include 3 Shape Dental System, Exocad Dental-CAD, and AvaDent digital denture. The digital meshes include a maxillary and mandibular soft tissue digital mesh that provides a high detail model of soft tissue, including denture borders. Digital meshes of the entire Unity template are also uploaded at step 1405, including digital meshes of the occlusal assembly, the maxillary arch subassembly, and the lower tray secured together. Collectively, these digital meshes provide the VDO to the CAD software. The digital meshes uploaded at step 1405 also include a digital mesh of the occlusal assembly with maxillary arch subassembly to provide the relationship between maxillary soft tissue and verified teeth position.

Continuing with reference to FIG. 14, at steps 1410-1420 the models are prepared for design. First, at 1410, a user selects the type of denture construction they wish to manufacture (e.g., 1pc, 2pc, printed, milled, hybrid, etc.). Next, at step 1415, the CAD software system, aligns meshes, trims and corrects digital mesh defects as needed. Then at step 1420, the CAD software system performs model analysis including occlusal plane and characteristic points, mark jaw boundaries, set insertion direction, and blockout of undercuts. The processing at steps 1415 and 1420 may be performed automatically or based on one or more inputs received from the user.

At steps 1425-1435, the information provided by CAD software system is used by a user to design a full mouth prosthetic trial denture based on inputs. At step 1425, a user selects from the anatomy library the corresponding tooth form and arch size as represented by the analog setup. The arch form is positioned manually or automatically relative to the customized template, and the teeth are individually adjusted. Next, at step 1430 the denture bases (representing tissue) are created. The denture bases can be generated in different configurations to create a denture (with full palatal base coverage) or an implant-supported prosthesis (with arch base coverage only). At step 1435, microanatomy is adjusted using digital sculpting tools along with the denture base assembly parameters. At this point, the design of the trial denture may be finalized and used to manufacture the denture.

Once the position of the dentition has been digitized using the process described in steps 1405 through 1425, any full-mouth dental prosthetic can be designed, including but not limited to a denture, a radiographic guide, or an implant prosthesis. The processes described in FIG. 13 and FIG. 14 represent the entire analog and digital workflows for achieving an optimal full mouth reconstruction.

In some embodiments, the trial denture is manufactured with cavities along the lingual aspect of the maxillary denture base or tooth arch. The cavities receive a radiopaque material (e.g., gutta percha or zirconia balls). The trial denture with radiopaque markers is used in combination with a cone-beam computer tomography ("CBCT") scan to generate a set of data that relates the 3-dimensional position of the trial denture with respect to the patient's tissue and bone. This data set may then be combined with the data set generated in FIG. 14 to generate, for example, (i) a guide for surgical placement of one or more dental implants and (ii) a temporary implant prosthetic based on the planned implant position.

Once the analog part is scanned and digitized in the CAD software, the corresponding arch forms in the anatomy library are selected. Differences in the arch geometry, specifically any repositioning of the posterior quadrants, are identified, and the posterior quadrants of the digital mesh are reconciled by the CAD software to the new analog positions. In some embodiments, the CAD recognizes that an alteration needs to be made to adapt the CAD positions to the analog part. Then, when it adapts the design, the CAD software ensures that the design retain crucial relationships including cusp fossa and general occlusal function. The positioning of the lower anterior represents the positioning of the entire lower arch as it relates to the teeth in the upper arch in the ideal occlusal relationship.

The software processes illustrated in FIG. 14 and described in further detail throughout this disclosure provides various enhancements to conventional software used for designing and fitting implant or tissue supported dentures. For example, in some embodiments of the present invention utilizes a database of meshes corresponding to physical teeth, arch and tissue anatomies. The anatomy library comprises a plurality of tooth, arch, and tissue anatomy that correspond to the plurality of physical maxillary and mandibular arch anatomy in the prosthetic positioning assembly. The tooth, arch, and tissue anatomy mesh database contains additional anatomy metadata, such as free gingival margin line, cusp and fossa locations, contours of interdental papilla and attached mucosa, contact point locations, etc.

The techniques described herein facilitate the placement/alignment of maxillary tooth and arch form. The plurality of tooth anatomy meshes in the anatomy library is registered to the digital mesh of the customized unity template via a mesh alignment algorithm (such as iterative closest point) using a single or plurality of user marked reference points. In some embodiments, the plurality of tooth meshes is arranged into 3 rigid groups corresponding to the maxillary anterior, maxillary left posterior, maxillary right posterior components. Automatic mesh alignment of a plurality of teeth functions to rapidly duplicate the verified tooth placement and arch form of a customized unity template without the need for significant user input. Conventional software workspaces for teeth placement and alignment, such as 3Shape's Smile Composer functionality, require the user to manually drag, drop, and rotate individual meshes or groups of meshes of teeth to the desired 3D position using on-screen controls. The meshes of teeth are positioned relative to a mesh of a wax rim (containing no tooth references) or mesh of a wax-up (containing non-corresponding tooth references). The manual alignment is time-consuming and not precise.

The system described herein also facilitates the identification, positioning, characterization of gingival tissue anatomy. The digital mesh representing the customized unity template includes gingival tissue anatomy. The free gingival margin metadata packaged with the tooth mesh anatomy library enables rapid identification of the buccal gingival tissue via a boolean difference algorithm. The plurality of registered tooth meshes is subtracted (via boolean difference) from the digital mesh of the customized unity template, leaving a mesh that represents the tissue anatomy above the free gingival margin. The tissue mesh within the anatomy library is registered to the tissue mesh remaining after subtraction via a mesh alignment algorithm (such as iterative closest point) using a singular or plurality of user marked reference points. The tissue mesh is then lofted to the denture border to generate a complete denture base. Automatic identification and positioning of pre-characterized tissue significantly decreases the skilled input required by a user and enables modification of the tissue design if changes are desired. Conventional dental CAD software workspaces for tissue design generate the tissue surface 1) dynamically by creating a lofted surface from the denture border to the free gingival margin of denture library teeth or 2) lofting from the denture border to the superior border of a library tooth and tissue arch. The conventional algorithms used in method 1 and method 2 create a non-aesthetic tissue design that must be corrected digitally or by hand after manufacturing.

According to some embodiments, the system described herein utilizes an ornamental design of a denture with cavities along the lingual of the arch form. A 1 or 2-piece denture design with a plurality of cylindrical cavities is positioned along the lingual tissue surface of the denture arch form. In other embodiments, the cylindrical cavities can be positioned along the tissue surface (referred to as "intaglio") of the denture base or tooth arch form. As described above, the cylindrical cavities may be incorporated into the denture during CNC milled or 3D printed manufacturing. A radiopaque material, such as zirconia, metal, or gutta percha, is placed into the cylindrical cavities after manufacturing.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The system and processes of the figures are not exclusive. Other systems, processes, and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. No claim element herein is to be construed under the provisions of 35 U.S.C. 112(f), unless the element is expressly recited using the phrase "means for."

The invention claimed is:

1. A dental prosthetic positioning assembly comprising:
    an occlusal assembly comprising:
        a maxillary tray configured to be formed in a patient's maxillary alveolar ridge, wherein the maxillary tray comprises an occlusal rim component, and
        a carriage frame component composed of biocompatible magnetic metal material anchored to the maxillary tray;
    a maxillary arch subassembly comprising a plurality of prosthetic maxillary teeth components magnetically anchored to the occlusal rim component; and
    one or more spacers for adjusting a distance between the carriage frame component and the maxillary tray,
    wherein (i) the carriage frame component is moveable with respect to the maxillary tray and (ii) the prosthetic maxillary teeth components are individually moveable with respect to each other to achieve a desired dental positioning.

2. The dental prosthetic positioning assembly of claim 1, wherein the plurality of prosthetic maxillary teeth components in the maxillary arch subassembly comprise:
    a maxillary arch left posterior component;
    a maxillary anterior component; and
    a maxillary arch right posterior component.

3. The dental prosthetic positioning assembly of claim 2, wherein the maxillary anterior component is moveable in an anterior and a posterior direction along the carriage frame component to achieve an ideal incisal edge position.

4. The dental prosthetic positioning assembly of claim 2, wherein the plurality of prosthetic maxillary teeth components are moveable in a left and right direction along the carriage frame component to achieve a desired maxillary midline position for the patient's mouth.

5. The dental prosthetic positioning assembly of claim 2, wherein the maxillary arch left posterior component and the maxillary arch right posterior component are individually rotatable with respect to the maxillary anterior component on the carriage frame component to achieve a desired buccal corridor for the patient's mouth.

6. The dental prosthetic positioning assembly of claim 2, wherein the posterior maxillary teeth components of the maxillary arch subassembly are connected to each other using magnetic anchors.

7. The dental prosthetic positioning assembly of claim 6, wherein the magnetic anchors restrict all movement of the posterior maxillary teeth components except for rotation.

8. The dental prosthetic positioning assembly of claim 2, wherein the maxillary anterior component comprises facial, occlusal and lingual contours of 6 maxillary anterior teeth.

9. The dental prosthetic positioning assembly of claim 8, wherein the maxillary arch left posterior component and the maxillary arch right posterior component each comprise buccal, occlusal and lingual contours of 4 posterior teeth.

10. The dental prosthetic positioning assembly of claim 9, wherein the maxillary anterior component comprises a crescent shaped protrusion located at a lingual aspect of the maxillary anterior teeth and holding one or more anchors for coupling with the maxillary arch left posterior component and the maxillary arch right posterior component.

11. The dental prosthetic positioning assembly of claim 10, wherein the one or more anchors are magnets or ferromagnetic material.

12. The dental prosthetic positioning assembly of claim 1, wherein the occlusal rim component comprises a plurality of embedded magnetic anchors and/or a ferromagnetic material.

13. The dental prosthetic positioning assembly of claim 12, wherein the plurality of embedded magnetic anchors comprise (i) a first set of magnetic anchors positioned anterior to the occlusal rim component and (ii) a second set of magnetic anchors positioned posterior to the occlusal rim component.

14. The dental prosthetic positioning assembly of claim 1, wherein the spacers are magnet disks anchored to the ferromagnetic occlusal rim component.

15. The dental prosthetic positioning assembly of claim 1, wherein the distance is adjusted by stacking or unstacking magnet spacers.

16. The dental prosthetic positioning assembly of claim 1, wherein the spacers are arch shaped and magnetically anchor to the occlusal rim component.

17. The dental prosthetic positioning assembly of claim 1, further comprising:

a mandibular anterior subassembly holding a plurality of prosthetic mandibular teeth.

18. The dental prosthetic positioning assembly of claim 17, wherein the mandibular anterior comprises a pin for adjusting the vertical dimension of occlusion, a_3D positional relationship between the patient's maxilla and the patient's jaw.

* * * * *